(12) United States Patent
Patki et al.

(10) Patent No.: US 6,944,185 B2
(45) Date of Patent: Sep. 13, 2005

(54) SELECTABLE DEPACKETIZER ARCHITECTURE

(75) Inventors: Ema Patki, Mountain View, CA (US); Daniel C. W. Wong, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 733 days.

(21) Appl. No.: 09/883,009

(22) Filed: Jun. 15, 2001

(65) Prior Publication Data

US 2002/0034193 A1 Mar. 21, 2002

Related U.S. Application Data

(63) Continuation of application No. 09/507,628, filed on Feb. 17, 2000, now Pat. No. 6,252,889, which is a continuation of application No. 08/958,610, filed on Oct. 27, 1997, now Pat. No. 6,181,713.

(51) Int. Cl.[7] ................................................. H01J 3/24
(52) U.S. Cl. ........................................ 370/474; 370/476
(58) Field of Search .............................. 370/389, 394, 370/395, 396, 465, 470, 471, 472, 473, 474, 476, 477

(56) References Cited

U.S. PATENT DOCUMENTS

| | | | | |
|---|---|---|---|---|
| 5,377,051 A | * | 12/1994 | Lane et al. | 386/81 |
| 5,387,941 A | * | 2/1995 | Montgomery et al. | 348/473 |
| 5,390,184 A | * | 2/1995 | Morris | 370/353 |
| 5,559,559 A | * | 9/1996 | Jungo et al. | 348/432.1 |
| 5,691,986 A | * | 11/1997 | Pearlstein | 370/477 |
| 5,832,256 A | * | 11/1998 | Kim | 713/501 |

* cited by examiner

Primary Examiner—Bob A. Phunkulh
(74) Attorney, Agent, or Firm—Martine Penilla & Gencarella, LLP

(57) ABSTRACT

A scheme is provided that permits the use of a selectable depacketization module to depacketize data streams. An RTP session manager is responsible for receiving RTP packets from a network and parsing/processing them. A depacketizer module is located using the type of data received on the stream. Thus a specific depacketizer is located at runtime depending on the coding decoding scheme ("codec") used to compress the incoming data stream. A naming convention is followed in order for a specific depacketizer to be located. The depacketizer receives data that has already been parsed and is in a readable form. The depacketizer outputs this data using a well defined interface. This interface has been designed such that it is generic across a number of codecs. The interface passes all relevant information to the decoder where the actual depacketized data stream will be decompressed. The session manager need not know of any codec details since the depacketizer handles all codec specific issues. A default format is described for data that is output by a depacketizer. There is provision for a depacketizer to output data in this pre-defined format. However, there is also a provision for a depacketizer to output data itself in a pre-defined format. This data is provided to a handler that is aware of this format, so that the integration of depacketizers is seamless. Thus, a depacketizer can be made available as long as it implements certain defined interfaces.

15 Claims, 4 Drawing Sheets

SELECTABLE DEPACKETIZER ARCHITECTURE

This is a continuation of application Ser. No. 09/507,628 filed Feb. 17, 2000 now U.S. Pat. No. 6,252,889 which is a continuation of application Ser. No. 08/958,610 filed Oct. 27, 1997 now U.S. Pat. No. 6,181,713.

BACKGROUND OF THE INVENTION

1. Field of the Invention

This invention relates to the field of sending and receiving data packets on a computer network.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

2. Background Art

Computers are often used to process, play back, and display video data, audio data and other data. This data may come from sources such as storage devices, on-line services, VCRs, cable systems, broadcast television tuners, etc. Video and audio data is memory intensive, that is, such data requires large amounts of memory for storage and use by a computer system. In addition, the transmission time of such large volume data from a remote source to a client computer can be expensive and be a limiting factor in the ability to provide such data at all.

To reduce the transmission bandwidth and memory requirements when working with data, various compression schemes have been developed so that less storage space is needed to store information and a smaller bandwidth is needed to transmit it. Prior art video compression schemes include Motion JPEG, MPEG-1, MPEG-2, Indeo, Quicktime, True Motion-S, CinePak, and others. Similarly, there are a number of compression schemes for audio data.

The use of compression schemes for transmitting video and audio is particularly important in the context of computer networks, such as the Internet and World Wide Web. Providers wish to provide multi-media content that includes video and audio to users and transmit such content over the Internet. Transmission times become too long if the data is not compressed. In addition, it is not possible to provide real time streaming of video and audio data without a compression scheme.

RTP is a Real Time Transport protocol used to transmit audio and video on a network such as the Internet. Typically, audio or video data is compressed using a specific compression technique and the compressed data stream is broken down into smaller packets for transmission over the wire. This process is referred to as "packetization" and the reverse process, i.e. assembling network packets into a continuous byte stream is called "depacketization". An RTP session handler is a mechanism that controls the receipt and depacketization of packetized data at a client computer. In the prior art, the depacketization scheme is part of the RTP session handler's code. This is a disadvantage because it requires that the RTP session handler have foreknowledge of all possible packetization schemes. This makes it difficult to add new packetization schemes without requiring that a new RTP session handler be created. It would be advantageous if the depacketization could exist as a separate module.

SUMMARY OF THE INVENTION

A scheme is provided that permits the use of a selectable depacketization module to depacketize data streams. An RTP session manager is responsible for receiving RTP packets from a network and parsing/processing them. A depacketizer module is located using the type of data received on the stream. Thus a specific depacketizer is located at runtime depending on the coding decoding scheme ("codec") used to compress the incoming data stream. A naming convention is followed in order for a specific depacketizer to be located. The depacketizer receives data that has already been parsed and is in a readable form. The depacketizer assembles this data into frames and outputs frame data to a handler according to an interface of the preferred embodiment. This interface has been designed such that it is generic across a number of codecs. The interface passes all relevant information to the decoder where the actual depacketized data stream will be decompressed. The session manager need not know of any codec details since the depacketizer handles all codec specific issues.

A default format is described for data that is output by a depacketizer. There is provision for a depacketizer to output data in this pre-defined format. However, there is also a provision for a depacketizer to output data itself in a pre-defined format. This data is provided to a handler that is aware of this format, so that the integration of depacketizers is seamless. Thus, a depacketizer can be made available as long as it implements certain defined interfaces. Special intelligence on packet loss, error recovery, and other data can be utilized by the depacketizer and allows various proprietary codecs to be used inside of the RTP session manager, making use of the protocol state management code of the session manager.

DETAILED DESCRIPTION OF THE INVENTION

Figure 1:
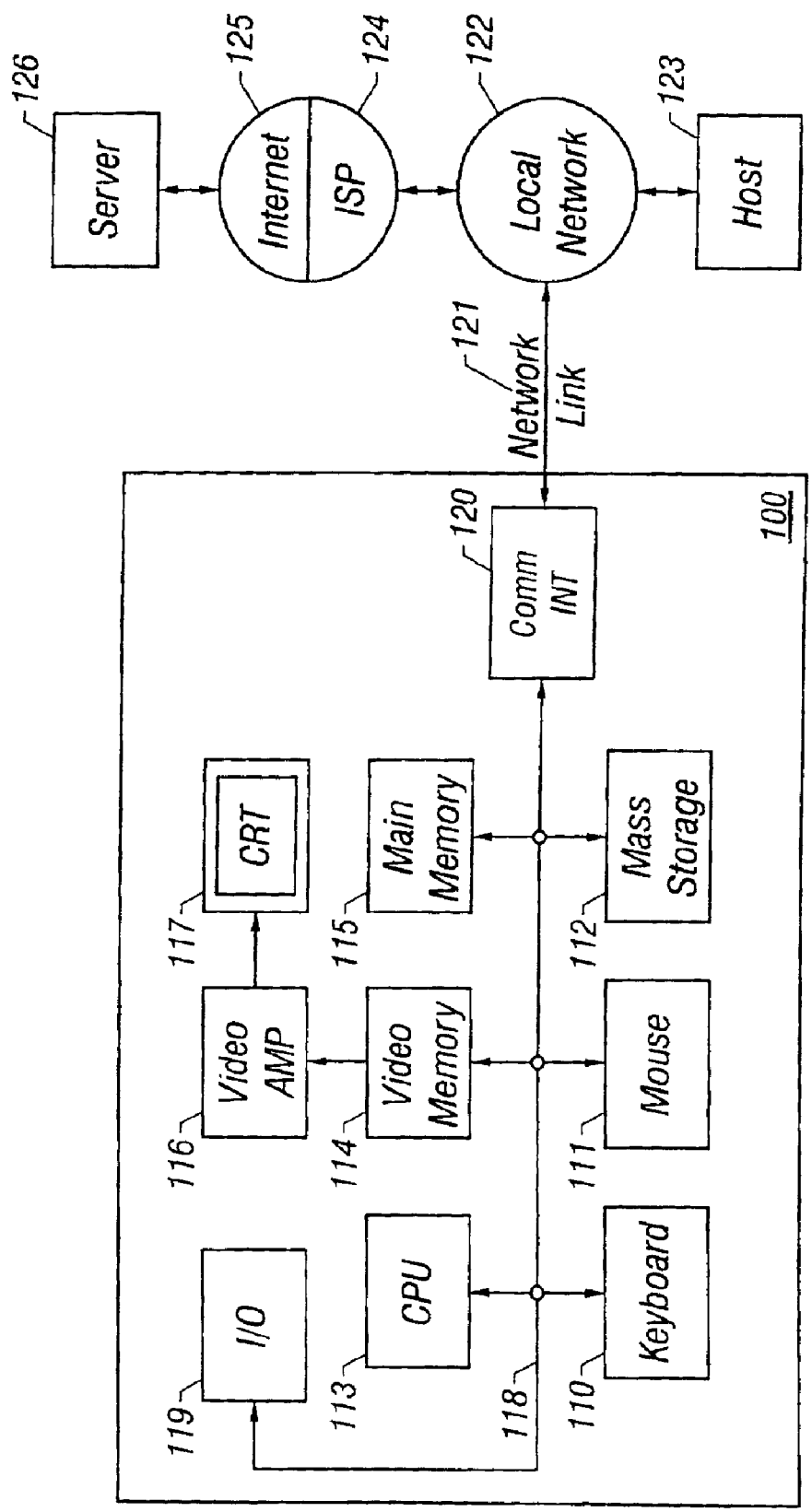
FIG. 1 is a block diagram of an exemplary computer system for implementing the present invention.

The invention is a method and apparatus for providing a selectable depacketizer. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Java

The preferred embodiment of the invention is implemented in the Java® language developed by Sun Microsystems, Inc. of Mountain View, Calif. The following is background on Java and on object oriented programming.

Java is an object-oriented programming language. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called encapsulation.

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both instance variables and methods for the class. An object class is used to create a particular instance of an object. An instance of an object class includes the variables and methods defined for the class. Multiple instances of a the same class can created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary"variable in the employee's employee object).

An object is a generic term that is used in the object-oriented programming environment to refer to a module that contains related code and variables. A software program can be written using an object-oriented programming language whereby the program's functionality is implemented using objects.

Development of software applications may be performed in an independent piecewise manner by establishing application programming interfaces (APIs) for components of the application. An API refers to the methods of a particular component that are accessible by other components, and the format by which those methods may be invoked. The particular implementation of those methods is important only with respect to the design of the particular component. Each component is designed individually to implement its respective API and any internal functions, and to interface with the APIs of the other components of the application. Typically, these components comprise one or more objects forming the application.

Examples of object-oriented programming languages include C++ and Java. Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

Embodiment of Computer Execution Environment (Hardware)

An embodiment of the invention can be implemented as computer software in the form of computer readable program code executed on a general purpose computer such as computer 100 illustrated in FIG. 1. A keyboard 110 and mouse 111 are coupled to a bi-directional system bus 118. The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as CPU 113, main memory 115, video memory 114 and mass storage 112. Alternatively, multiplex data/address lines may be used instead of separate data and address lines.

In one embodiment of the invention, the CPU 113 is a microprocessor manufactured by Motorola®, such as the 680X0 processor or a microprocessor manufactured by Intel®, such as the 80X86, or Pentium® processor, or a SPARC® microprocessor from Sun Microsystems®. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to host computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, server 126 might transmit a requested code for an application program through Internet 125, ISP 124, local network 122 and communication interface 120.

The received code may be executed by CPU 113 as it is received, and/or stored in mass storage 112, or other non-volatile storage for later execution. In this manner, computer 100 may obtain application code in the form of a carrier wave.

The computer systems described above are for purposes of example only. An embodiment of the invention may be implemented in any type of computer system or programming or processing environment.

Preferred Embodiment

The present invention provides a system that permits the use of a selectable depacketizer. The preferred embodiment of the present invention contemplates the use of RTP and the use of an RTP session manager to handle the receipt of data (in the preferred embodiment, video or audio data). The RTP session manager is described below.

RTP Session Manager

The RTP Session Manager (RTPSM) allows a local participant to participate (send or receive data) in a single RTP "session". The RTPSM maintains an updated state of the session as viewed from the local participant. In effect, an instance of an RTPSM is a local representation of a distributed entity (an RTP session). It allows an application to render and create data streams on an RTP session. One embodiment of this invention takes advantage of the Java Media Framework (JMF) described in Appendix A herein.

Figure 2:
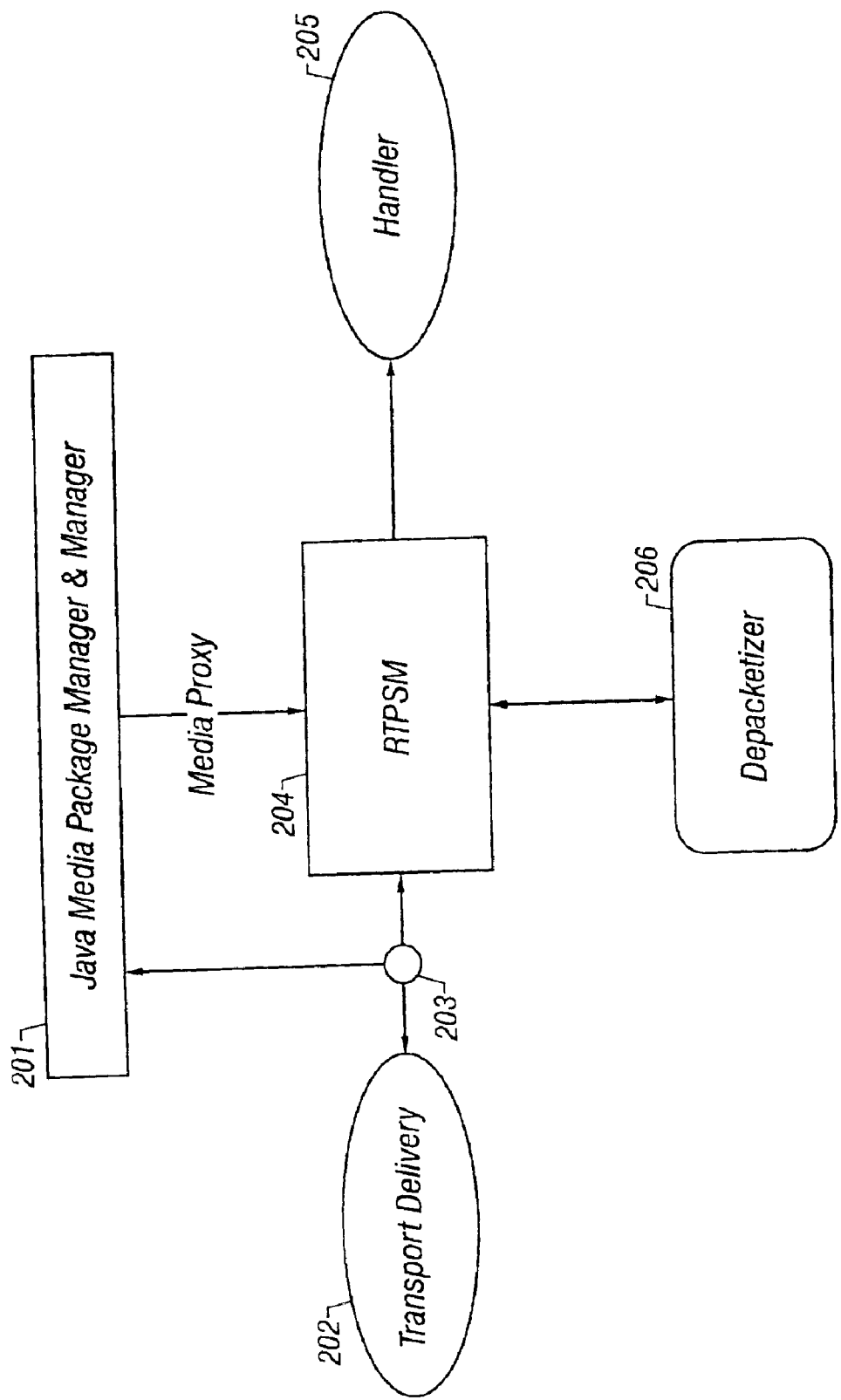
FIG. 2 illustrates the RTP Session Manager of the present invention.

A graphical representation of the RTP Session Manager is illustrated in FIG. 2. The java media package manager 201 handles the creation of players and locates the appropriate players. Manager 201 is part of the JMF. The Java Media Framework (JMF) is a set of multimedia APIs and implementations designed to playback multimedia in a variety of protocols and formats, such as a QuickTime Cinepak movie over the HTTP (Hypertext Transfer Protocol) protocol. The Java Media Framework specifies the concept of a "player," a unit to playback multimedia data.

Transport delivery 202 receives data streams from the network and provides them, via RTPSocket 203, to the RTP Session Manager 204. The Session Manager 204 inspects the RTP packet and determines what the encoding is. Depending on the type of encoding, the Session Manager 204 identifies and invokes the appropriate depacketizer 206. The Session Manager 204 sends RTP packets to the depacketizer 206. The depacketizer 206 assembles the packets into frames as appropriate for the codec environment of the packets and sends them via the Session Manager 204 to the handler 205. Handler 205 decodes the frames and provides playback as appropriate.

The RTPSM 204 represents the session with two dynamic sets of objects—a set of "participants" and a set of "streams". The stream is provided by transport delivery 202. These objects are created by and controlled by the RTPSM. A participant is a single machine, host or user participating in the session, while a stream is a series of data packets arriving from or sent by a single source. A participant may own more than one stream, each of which is identified by the SSRC used by the source of the stream.

At the top-most level the RTPSM manages a set of "participants"(RTPParticipant ), each represented by an instance of a class implementing the RTPParticipant interface. RTPSM implementations create RTPParticipant whenever a previously unidentified RTCP (Real Time Control Protocol) packet is received. (The RTPParticipant object is updated each time a subsequent RTCP packet from this source arrives).

In addition to the set of RTPParticipant objects, an RTPSM implementation also manages a set of RTPStream objects. Each such object represents a stream of RTP data packets on the session; if the stream originates from the local participant (the client) it is an instance of the RTPSendStream subclass; otherwise the stream is coming off the net from a remote participant and is an instance of the RTPRecvStream subclass.

Pluggable Depacketizer Architecture

Figure 4:
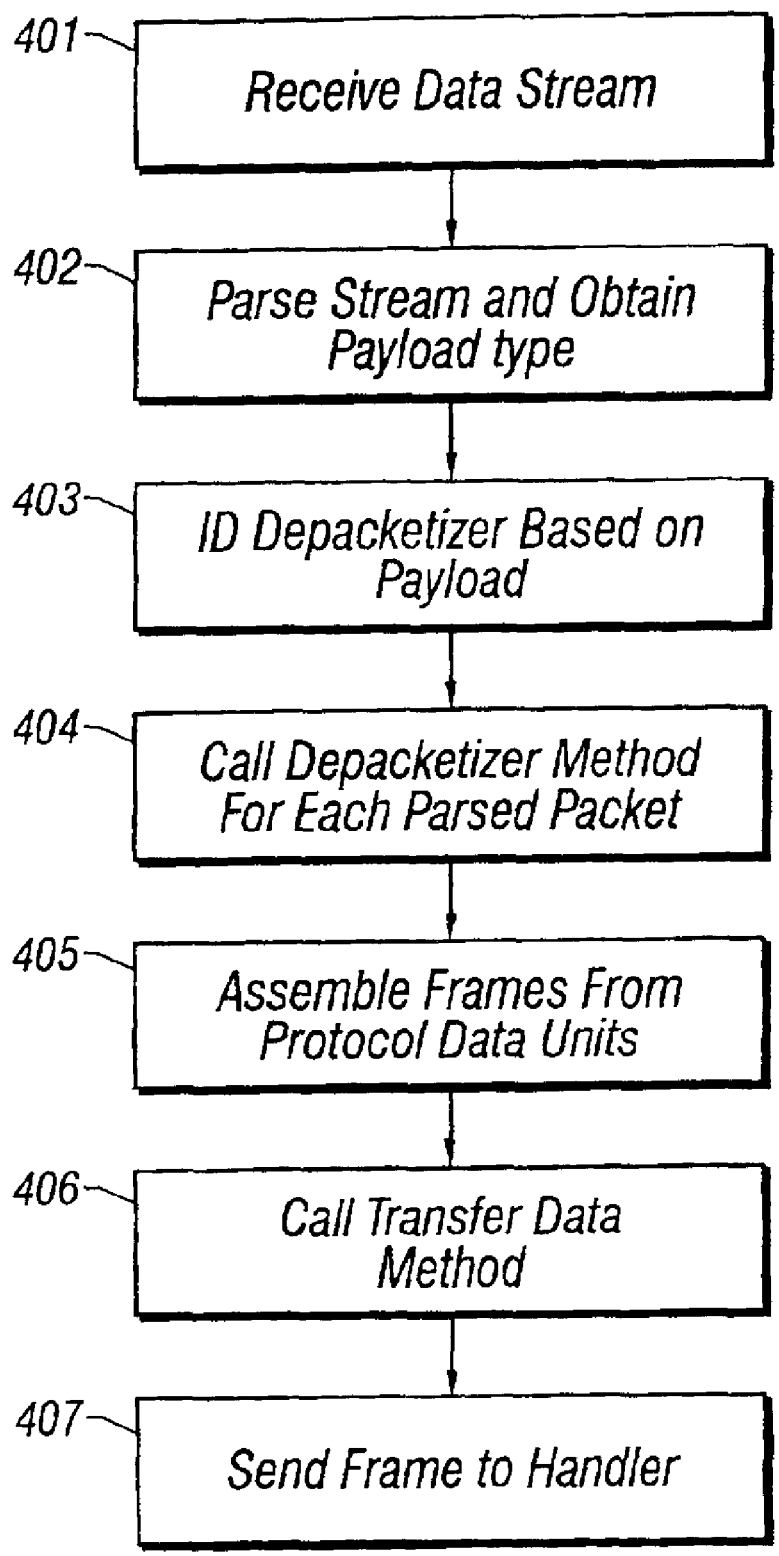
FIG. 4 is a flow diagram of the process of the present invention.

The preferred embodiment of the present invention provides a scheme for identifying an appropriate depacketizer module based on the codec type of incoming data. The depacketizer module assembles data into frames and provides it to a handler for decoding and playback. A flow diagram of this process is illustrated in FIG. 4.

At step 401 the RTP Session Manager receives a data stream. At Step 402 RTPSM obtains the payload type of the data stream by parsing the RTP header of the data.

At step 403 the appropriate depacketizer is called based on the results of the payload query in step 402. At step 404 the RTPSM calls the depacketize( ) method of the depacketizer each time it has received and parsed an RTP packet on the stream of the depacketizer.

The depacketizer assembles protocol data units received in the depacketize( ) method into application data units (frames) and notifies its DePacketizedDataHandler when it has finished preparing a frame of data at step 405 (RTPSM sets the transferHandler of the depacketizer once it has been instantiated using the depacketizer's setTransferHandler( ) method. The transferHandler of a depacketizer is a DePacketizedDataHandler and is the object to which depacketized data must be handed over by the depacketizer). Notification is done by calling the transferData( ) method of its DePacketizedDataHandler at step 406. The DePacketizedDataHandler then takes care of streaming the depacketized data to the handler of this stream at step 407.

Graphical Representation of the DePacketizer

Figure 3:
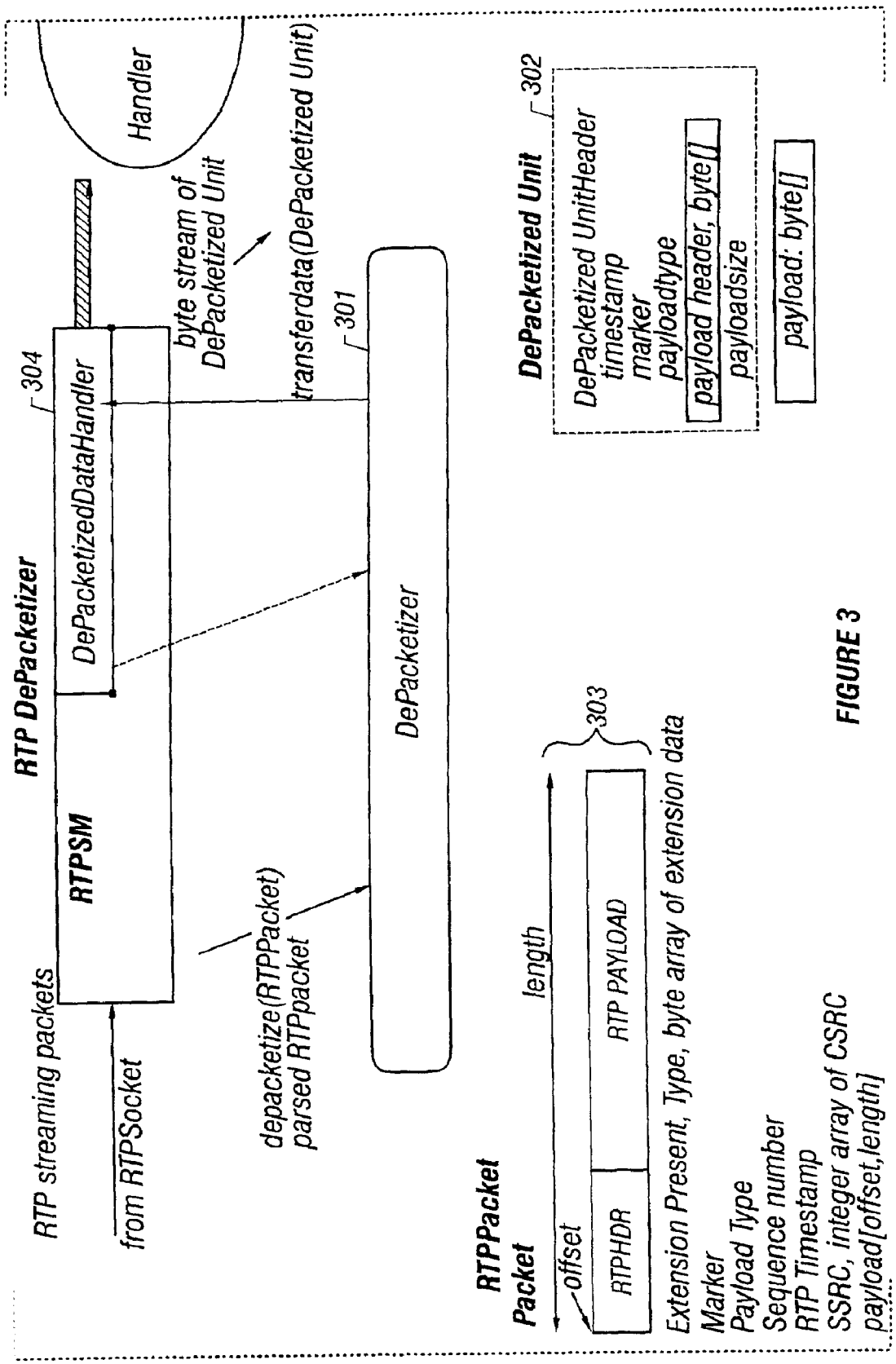
FIG. 3 illustrates the RTP Depacketizer of the present invention.

The operation of the Depacketizer is represented graphically in FIG. 3. RTP streaming packets are delivered to the RTP Session Manager 204. The RTP Session Manager examiners the first packet and examines the RTP header. The packet includes information such as Extension Present, Type, byte array of extension data, marker, Payload Type, Sequence Number, RTP timestamp, SSRC integer array of CSRC, and payload(offset, length). The parsed RTP packet is then provided to the DepacketizedDataHandler 301.

The Depacketizer depacketizes the RTP packet into a DepacketizedUnit 302. The DepacketizedUnit 302 includes a DepacketizedUnitHeader, a timestamp, a marker, payloadtype, payload header, and payload size. DtpacketizedUnits are essentially data frames and are provided from the depacketizer to the depacketizedatahandler which is part of the RTPSM. The RTPSM 204 will then provide this frame to the handler 205 for decoding and playback.

Depacketizer Interface

In the Java language, an interface is a collection of constants and abstract methods. A class can implement an interface by adding the interface to the class's "implements" clause. An abstract method can be overridden (i.e. replaced). A variable can be declared as an interface type and all of the constants and methods declared in the interface can be accessed from this variable.

The preferred embodiment of the present invention includes an interface called "RTPDepacketizer". This interface is implemented by all plug-in depacketizers in RTPSM in the preferred embodiment. The entry point from the RTPSM to the depacketizer is via the depacketize method. Application data units or frames are transferred from the depacketizer to the RTPSM by calling the transferDatao method of the DePacketizedDataHandler. The RTPSM is responsible for setting the DePacketizedDataHandler on a depacketizer. The Depacketizer interface implements the following methods:

depacketize public abstract void depacketize(RTPPacket p)

Called by RTPSM when a RTP packet arrives from the network or on the RTPSocket's output data stream.

setTransferHandler public abstract void setTransferHandler (DePacketizedDataHandler handler)

Used by RTPSM to set the transferHandler of this depacketizer. The depacketizer should call the transferData( ) method of its transferHandler when it has finished preparing a application data unit or frame. Object passed to the DePacketizedDataHandler is a DepacketizedDataUnit getMediaType public abstract String getMediaType( )

Used by RTPSM to retrieve the media type of the stream. This can be one of audio or video and is used to set content type of the RTPSM and the source streams it prepares.

getCodecString public abstract String getCodecString( )

Used by the RTPSM to set the codec string type on the data source stream it creates for the handler. This returns a string identifying the codec to be used. The Manager will locate a codec of type package-prefix.media.codec.mediatype.[codec-string].Codec.

public class DePacketizedUnitHeader

As illustrated in FIG. 3, a DePacketizedUnit includes a DePacketizedUnitHeader. A DePacketizedUnitHeader describes the DePacketizedUnit it belongs to. The header parameters are meant to describe the depacketized unit as a whole. The header contains certain fields from the RTP header of a packet considered relevant to the decoding and rendering process. In cases where the depacketizedUnit encompasses more than one RTP packet, the header needs to be filled correctly with data describing the unit as a whole. Programmers may have their own structure of the depacketized data unit or use the default class provided by RTPSM.

The constructor for this class is DePacketizedUnitHeader (long, int, int, int, byte[ ], int).

public DePacketizedUnitHeader(long rtptimestamp,
   int markerbit,
   int payloadtype,
   int payloadhdrsize,
   byte payloadhdr[ ],
   int payloadsize)

The parameters for this constructor are:

rtptimestamp—The RTP timestamp that came in protocol data units (RTP packets)of this stream. These are passed to the handler as they could be used for transferring timing information and synchronization by the handler markerbit—The marker bit in the RTP Header of this application data unit or frame. i.e. set to 1 if the marker bit was set for this ADU.

payloadtype—payload type of the data in this depacketizedunit payloadhdr—The payload specific header following the RTP header for this payload type payloadsize—Length of data in this DePacketizedUnit The methods of this class are as follows:

getSize
   public int getSize( )
getPayload
   public int getPayload( )
getMarker
   public int getMarker( )
getTimeStamp
   public long getTimeStamp( )
getPayloadHdrSize
   public int getPayloadHdrSize( )
getPayloadHdr
   public byte[ ] getPayloadHdr( )
public interface RTPPayload This is the interface implemented by all RTP datasources in order to query the payload type of the data received on this datasource. If RTP data has not yet been received on this datasource, it will return the field UNKNOWN_PAYLOAD, a constant returned when no data has been received on this datasource.

The methods for this interface are as follows:

setPayloadType public abstract void setPayloadType(int type)

Used to set the payload of this datasource. If payload has previously been set, it will be reset to this new payload type.

getPayloadType public abstract int getPayloadType( )

Returns the payload type of this datasource getCodecString public abstract String getCodecString( )

Returns the Codec string for the codec to be used to decode data from this datasource setCodecString public abstract void setCodecString(String codec)

Used to set the codec string of the datasource/stream. If codec string has been previously set, it will be reset to this new codec string Content Handlers The invention provides a design that enables a programmer to plug-in his/her own depacketizer. Content handlers for this depacketizer should be available in order to playback this depacketized stream. In the preferred embodiment, integration between the depacketizer and content handler is provided when depacketizers implement a pluggable depacketizer interface and handlers are programmed to expect data in a pre-determined format described below in connection with pluggable content handlers.

In the preferred embodiment, a default predetermined format is provided in RTPSM, but this does not preclude the programmer from using his/her own format of depacketized data. Pluggable depacketizer naming and searching conventions are designed according to JMF's player factory architecture and use the same rules for integrating depacketizers into RTPSM. For example, to integrate a new depacketizer into JMF, 1) The depacketizer implements the interface defined below.

2) Install the package containing the new depacketizer class.

3) Add the package prefix to the content prefix list controlled by the PackageManager.

4) The DePacketizerFactory queries the PackageManager for the list of content package prefixes and search for <package-prefix>.media.rtp.depacketizer.avpx.DePacketizer class, where x is the RTP payload type for the installed depacketizer.

RTP Content Handlers are JMF players and should implement the methods and semantics of a Java Media Player. Integrating new handlers or players is as explained in the JMF specification attached as an Appendix. The content type of RTP datasources created by the session manager is one of "rtp/audio" or "rtp/video". Manager will consequently search for a handler of the type <package-prefix>.media.content.rtp.audio.Handler or <package-prefix>.media.content.rtp.video.Handler.

Note: JMF will not change handlers once a handler has been chosen and created by Manager. It is therefore important to note that the loaded Handler should be capable of supporting expected audio or video RTP payload types in order to successfully playback data streams.

Manager creates the datasource and sets it on the handler. This datasource is a PushDataSource and streams a PushSourceStream as explained in the JMF specification in package javax.media.protocol. Handlers can read data from this stream as explained in the specification. When the Manager creates a datasource and locates a handler for it, it calls setsource( ) on the handler, passing it the datasource. At this time, the handler returns an IncompatibleSourceException if it does not support the datasource. All RTP datasources implement the javax.media.rtp.RTPPayload interface. The getPayloadType( ) method can be used by the handler to query the payload type of the datasource. If the handler does not support playback of the payload type, it may return an IncompatibleSourceException. This causes Manager to continue searching for a handler that does support this datasource. In this manner, implementations can default to using handlers in the system that do support a certain payload not supported by this handler. Note: The RTP datasource can return a payload type only after data has actually been received on it. This is not a guaranteed process to happen before the getPayload( ) call is issued. In the event that data is not received on the datasource, UNKNOWN_PAYLAOD is returned by the datasource. The handler at this time can use its discretion and make a decision to support any payloads expected on this stream or to throw an IncompatibleSourceException.

The RTP Session Manager will stream data to the content handler as a PushSourceStream. The byte stream read by the handler is a DePacketizedObject converted to a stream of bytes. The structure of the object need not be known to the RTPSM. It uses the toByteStream( ) method of the interface to stream bytes from the DePacketizedObject to the sourcestrearn of the handler. RTPSM provides a default implementation of the DePacketizedObject interface. i.e. DePacketizedUnit.java. Programmers can write depacketizers which create a DePacketizedUnit explained in javax.media.rtp.RTPSessionManager.dePacketizer.DePacketizedUnit.java. The toByteStream( ) method has been implemented in DePacketizedUnit. Thus the user need not do anything more than create a DePacketizedUnit.

Thus, a method and apparatus for providing a selectable depacketizer has been described in conjunction with one or more specific embodiments. The invention is defined by the claims and their full scope of equivalents.

<p style="text-align:center">Java Media Players</p>

<p style="text-align:center">Version 1.0.2</p>

<p style="text-align:center">Oct. 14, 1997</p>

© 1997 Sun Microsystems Inc. 2550 Garcia Avenue, Mountain View, Calif. 94043-1100 U.S.A. All rights reserved.

RESTRICTED RIGHTS LEGEND: Use, duplication, or disclosure by the United States Govemment is subject to the restrictions set forth in DFARS 252.227-7013 (c)(1)(ii) and FAR 52227-19.

The release described in this document may be protected by one or more U.S. patents, foreign patents, or pending applications.

Sun Microsystems, Inc. (SUN) hereby grants to you a fully paid, nonexclusive, nontransferable, perpetual, worldwide limited license (without the right to sublicense) under SUN's intellectual property rights that are essential to practice this specifcation. This license allows and is limited to the creation and distribution of clean-room implementations of this specification that (i) are complete implementations of this specification, (ii) pass all test suites relating to this specification that are available from SUN, (iii) do not derive from SUN source code or binary materials, and (iv) do not include any SUN binary materials without an appropriate and separate license from SUN.

Java and Javascript are trademarks of Sun Microsystems, Inc. Sun, Sun Microsystems, Sun Microsystems Computer Corporation, the Sun logo, the Sun Microsystems Computer Corporation logo, Java and HotJava are trademarks or registered trademarks of Sun Microsystems, Inc. UNIX® is a registered trademark in the United States and other countries, exclusively licensed through X/Open Company, Ltd. All other product names mentioned herein are the trademarks of their respective owners.

THIS PUBLICATION IS PROVIDED "AS IS" WITHOUT WARRANTY OF ANY KIND, EITHER EXPRESS OR IMPLIED, INCLUDING, BUT NOT LIMITED TO, THE IMPLIED WARRANTIES OF MERCHANTABILITY, FITNESS FOR A PARTICULAR PURPOSE, OR NON-INFRINGEMENT.

THIS PUBLICATION COULD INCLUDE TECHNICAL INACCURACIES OR TYPOGRAPHICAL ERRORS. CHANGES ARE PERIODICALLY ADDED TO THE INFORMATION HEREIN; THESE CHANGES WILL BE INCORPORATED IN NEW EDITIONS OF THE PUBLICATION, SUN MICROSYSTEMS, INC. MAY MAKE IMPROVEMENTS AND/OR CHANGES IN THE PRODUCT(S) AND/OR THE PROGRAM(S) DESCRIBED IN THIS PUBLICATION AT ANY TIME

<p style="text-align:center">Preface</p>

The Java Media Framework (JMF) is an application programming interface (API) for incorporating media data types into Java applications and applets. It is specifically designed to take advantage of Java platform features. The 1.0 version of JMF provides APIs for media players; future versions will support media capture and conferencing. This document describes the Java Media Player APIs and how they can be used to present time-based media such as audio and video.

Java Media Players

The 1.0 specification for Java Media Players addresses media display and the concerns of the application builder in that domain, with an eye towards the other application domains and other levels of developer. There are two parts to this release: a user guide entitled "Java Media Players" and the accompanying API documentation.

Future Releases

Javasoft and its partners are developing additional capabilities and features that will appear in a future release of the JMF specification. The features that we are considering for future releases include:

Incomplete Players—A JMF Player is self-contained and does not provide access to its media data. Additional interfaces that provide access to media data and allow selection of rendering components are in development and intended for a future release.

Rendering Interfaces—Rendering interfaces for specific audio and video formats and additional interfaces for audio and video renderers will be developed for a future release.

Capture Semantics—The JMF Player architecture does not support the media capture capabilities required for authoring or conferencing applications. Capture semantics will be addressed in a future release.

Data Definitions—JMF 1.0 provides an overall structure for data manipulation and format negotiation among generic formats. Future releases will address specific interfaces for audio and video data.

CODEC Architecture—A CODEC (coder-decoder) architecture will be defined in a future release to provide a common API for using CODECs to compress and decompress media data and a mechanism for installing additional CODECs into the system.

Contact Information

JavaSoft

To obtain information about the Java Media Framework, see the web site at:

HTTP://java.sun.com/products/java-media/jmf

Silicon Graphics

To obtain information about Java Media Framework implementations for Silicon Graphics hardware, send mail to:

cosmo-motion-info@sgi.com

Intel Corporation

To obtain information about Java Media Framework implementations for Intel hardware, see the web site at:

HTTP://developer.intel.com/ial/jmedia

Change History

Version 1.0.2

Added attribution for blockingRealize example code in Section 5. Versions 1.0 and 1.0.1 of this document erroneously omitted this attribution. This example code is used with the permission of Bill Day and JavaWorld magazine. It was first published April 1997 in Bill Day's article "Java Media Framework Player API: Multimedia Comes to Java" in JavaWorld magazine, an online publication of Web Publishing Inc.

Changed references to PlayerClosedEvent and Player.close to Controller-ClosedEvent and Controller.close in Section 5.

Changed java.media to javax.media in Appendix B.

Changed example in Appendix C to use Time objects as parameters for setStop-Time and setMediaTime.

Version 1.0.1

Fixed inconsistenices with JMF 1.0 API.

Version 1.0

Updated document for final JMF 1.0 API release.

Java Media Players

Sun Microsystems, Inc.
Silicon Graphics Inc.
Intel Corporation
Copyright© 1997 by Sun Microsysems Inc.
All Rights Reserved The Java Media Framework (JMF) 1.0 specification defines APIs for displaying time-based media. This document describes these APIs and how they can be used to present media such as audio and video.

Media display encompasses local and network playback of multimedia data within an application or applet. The focus of the JMF 1.0 Player APIs is to support the delivery of synchronized media data and to allow integration with the underlying platform's native environment and Java's core packages, such as java.awt. The Player APIs support both client pull protocols, such as HTTP, and server push protocols, such as RTP.

JMF makes it easy to incorporate media in client applications and applets, while maintaining the flexibility needed for more sophisticated applications and platform customization:

Client programmers can create and control Java Media Players for any standard media type using a few simple method calls.

Technology providers can extend JMF to support additional media formats or perform custom operations by creating and integrating new types of media controllers, media players, and media data sources. These extensions can be used side-by-side with existing JMF objects.

"Extending JMF" on page 32 contains information about extending JMF; however, this document is intended primarily for application and applet developers.

1.0 Overview

JMF provides a platform-neutral framework for displaying time-based media. The Java Media Player APIs are designed to support most standard media content types, including MPEG-1, MPEG-2, QuickTime, AVI, WAV, AU, and MDI. Using JMF, you can synchronize and present time-based media from diverse sources.

Existing media players for desktop computers are heavily dependent on native code for computationally intensive tasks like decompression and rendering. The JMF API provides an abstraction that hides these implementation details from the developer. For example, a particular JMF Player implementation might choose to leverage an operating system's capabilities by using native methods. However, by coding to the JMF API, the application or applet developer doesn't need to know whether or not that implementation uses native methods.

The JMF Player API:

Scales across different protocols and delivery mechanisms

Scales across different types of media data

Provides an event model for asynchronous communication between JMF Players and applications or applets

1.1 Data Sources

A DataSource encapsulates the location of media and the protocol and software used to deliver the media. A Java Media Player contains a DataSource. Once obtained, the source cannot be reused to deliver other media. A Player's data source is identified by either a JMF MediaLocator or a URL (universal resource locator).

MediaLocator is a JMF class that descnbes the media that a Player displays. A MediaLocator is similar to a URL and can be constructed from a URL. In Java, a URL can only be constructed if the corresponding protocol handler is installed on the system. MediaLocator doesn't have this restnction.

Java Media Players can present media data obtained from a variety of sources, such as local or network files and live broadcasts. JMF supports two different types of media sources:

- Pull Data-Source—the client initiates the data transfer and controls the flow of data from pull data-sources. Established protocols for this type of data include Hypertext Transfer Protocol (HTTP) and FILE.
- Push Data-Source—the server initiates the data transfer and controls the flow of data from a push data-source. Push data-sources include broadcast media, multicast media, and video-on-demand (VOD). For broadcast data, one protocol is the Real-time Transport Protocol (RTP), under development by the Internet Engineering Task Force (IETF). The MediaBase protocol developed by SGI is one protocol used for VOD.

The degree of control that a client program can extend to the user depends on the type of media source being presented. For example, an MPEG file can be repositioned and a client program could allow the user to replay the video clip or seek to a new position in the video. In contrast, broadcast media is under server control and cannot be repositioned. Some VOD protocols might support limited user control—for example, a client program might be able to allow the user to seek to a new position, but not fast forward or rewind.

1.2 Players

A Java Media Player is an object that processes a stream of data as tine passes, reading data from a DataSource and rendering it at a precise time. A Java Media Player implements the Player interface.

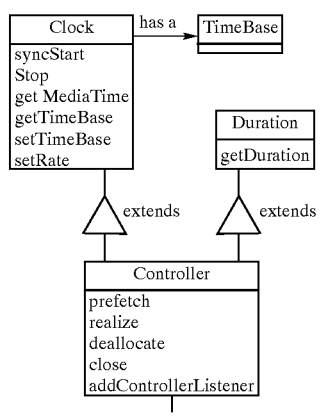

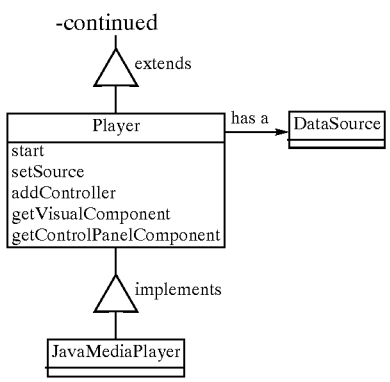

Clock defines the basic timing and synchronization operations that a Player uses to control the presentation of media data.

Controller extends Clock to provide methods for managing system resources and preloading data and a listening mechanism that allows you to receive notification of media events.

Duration provides a way to determine the duration of the media being played.

Payer supports standardized user control and relaxes some of the operational restrictions imposed by Clock.

Players share a common model for timekeeping and synchronization. A Player's media time represents the current position in the media stream. Each Player has a Time-Base that defines the flow of time for that Player. When a Player is started, its media time is mapped to its time-base time. To be synchronized, Players must use the same Time-Base.

A Player's user interface can include both a visual component and a controlpanel component. You can implement a custom user-interface for a Player or use the Player's default control-panel component.

A Player must perform a number of operations before it is capable of presenting media. Because some of these operations can be time consuming, JMF allows you to control when they occur by defining the operational states of a Player and providing a control mechanism for moving the Player between those states.

1.3 Media Events

The JMF event reporting mechanism allows your program to respond to media-driven error conditions, such as out-of-data or resource unavailable conditions. The event system also provides an essential notification protocol; when your program calls an asynchronous method on a Player, it can only be sure that the operation is complete by receiving the appropriate event.

Two types of JMF objects post events: GainControl objects and Controller objects. Controller and GainControl follow the established Java Beans patterns for events.

A GainControl object posts only one type of event, GainChangeEvent. To respond to gain changes, you implement the GainChangeListener interface.

A Controller can post a variety of events that are derived from ControllerEvent. To receive events from a Controller such as a Player, you implement the ControllerListener interface. The following figure shows the events that can be posted by a Controller.

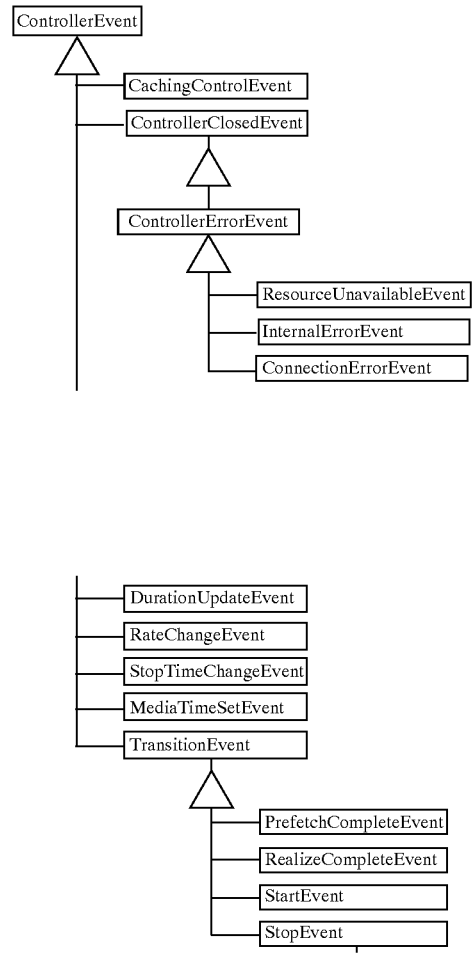

ControllerEvents fall into three categories: change notifications, closed events, and transition events:

Change notification events such as RateChangeEvent and DurationUpdateEvent indicate that some attribute of the Player has changed, often in response to a method call. For example, the Player posts a RateChangeEvent when its rate is changed by a call to setRate.

TransitionEvents allow your program to respond to changes in a Player's state. A Player posts transition events whenever it moves from one state to another. (See Section 1.4 for more information about Player states.)

ControllerClosedEvents are posted by a Player when the Player shuts down. When a Player posts a ControllerClosedEvent, it is no longer usable. A ControllerErrorEvent is a special case of ControllerClosedEvent. You can listen for ControllerErrorEvents so that your program can respond to Player malfunctions, minimizing the impact on the user.

1.4 Player States

A Java Media Player can be in one of six states. The Clock interface defines the two primary states: Stopped and Started. To facilitate resource management, Controller breaks the Stopped state down into five standby states: Unrealized, Realizing, Realized, Prefetching, and Prefetched.

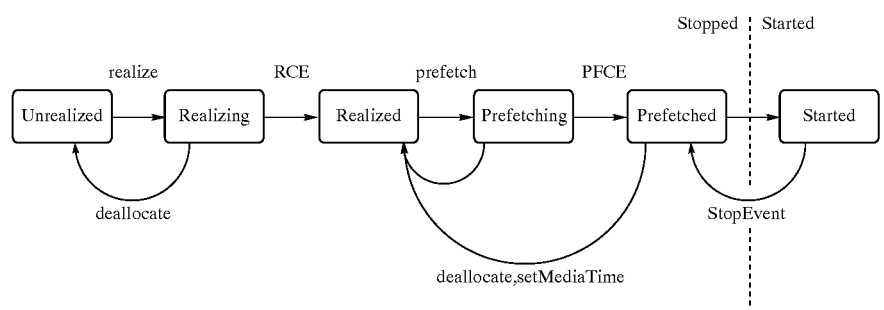

In normal operation, a Player steps through each state until it reaches the Started state:

A Player in the Unrealized state has been instantiated, but does not yet know anything about its media. When a media Player is first created, it is Unrealized.

When realize is called, a Player moves from the Unrealized state into the Realizing state. A Realizing Player is in the process of determining its resource requirements. During realization, a Player acquires the resources that it only needs to acquire once. These might include rendering resources other than exclusive-use resources. (Exclusive-use resources are limited resources such as particular hardware devices that can only be used by one Player at a time; such resources are acquired during Prefetching.) A Realizing Player often downloads assets over the net.

When a Player finishes Realizing, it moves into the Realized state. A Realized Player knows what resources it needs and information about the type of media it is to present. Because a Realized Player knows how to render its data, it can provide visual components and controls. Its connections to other objects in the system are in place, but it does not own any resources that would prevent another Player from starting.

When prefetch is called, a Player moves from the Realized state into the Prefetching state. A Preferching Player is preparing to present its media. During this phase, the Player preloads its media data, obtains exclusive-use resources, and anything else it needs to do to prepare itself to play. Prefetching might have to recur if a Player's media presentation is repositioned, or if a change in the Player's rate requires that additional buffers be acquired or alternate processing take place.

When a Player finishes Prefetching, it moves into the Prefetched state. A Prefetched Player is ready to be started; it is as ready to play as it can be without actually being Started.

Calling start puts a Player into the Started state. A Started Player's timebase time and media time are mapped and its clock is running, though the Player might be waiting for a particular time to begin presenting its media data.

A Player posts TransitionEvents as it moves from one state to another. The ControllerListener interface provides a way for your program to determine what state a Player is in and to respond appropriately.

Using this event reporting mechanism, you can manage Player latency by controlling when a Player begins Realizing and Prefetching. It also enables you to ensure that the Player is in an appropnate state before calling methods on the Player.

1.4.1 Methods Available in Each Player State

To prevent race conditions, not all methods can be called on a Player in every state. Table 1, "Restrictions on Player Methods" identifies the restrictions imposed by JMF. If you call a method that is illegal in a Player's current state, the Player throws an error or exception.

TABLE 1

Restrictions on Player Methods

| Method | Unrealized Player | Realized Player | Prefetched Player | Started Player |
| --- | --- | --- | --- | --- |
| getStartLatency | NotRealizedError | legal | legal | legal |
| getTimeBase | NotRealizedError | legal | legal | legal |
| setMediaTime | NotRealizedError | legal | legal | legal |
| setRate | NotRealizedError | legal | legal | legal |
| getVisualComponent | NotRealizedError | legal | legal | legal |
| getControlPanelComponent | NotRealizedError | legal | legal | legal |
| getGainControl | NotRealizedError | legal | legal | legal |
| setStopTime | NotRealizedError | legal | legal | StopTimeSetError if previously set |
| syncStart | NotPrefetchedError | NotPrefetchedError | legal | ClockStartedError |
| setTimeBase | NotRealizedError | legal | legal | ClockStartedError |
| deallocate | legal | legal | legal | ClockStartedError |
| addController | NotRealizedError | legal | legal | ClockStartedError |
| removeController | NotRealizedError | legal | legal | ClockStartedError |
| mapToTimeBase | ClockStoppedException | ClockStoppedException | ClockStoppedException | legal |

1.5 Calling JMF Methods

JMF uses the following convention for errors and exceptions:

Java Media Errors are thrown when a program calls a method that is illegal in the object's current state. Errors are thrown in situations where you have control over the state and the requested operation could result in a race condition. For example, it is an error to call certain methods on a Started Player. It is your responsibility to ensure that a Player is stopped before using these methods. Applications should not catch JMF errors; well-written applications will never encounter these errors.

Java Media Exceptions are thrown when a program calls a method that cannot be completed or is not applicable in the object's current state. Exceptions are thrown in situations where you do not necessarily have control over the state. For example, an exception is thrown if you attempt to synchronize two Players with incompatible time bases. This is not an error because you could not determine ahead of time that the time bases were incompatible. Similarly, if you call a method that is only applicable for a Started Player and the Player is Stopped, an exception is thrown. Even if you just started the Player, it might have already stopped in response to other conditions, such as end of media.

Some JMF methods return values that indicate the results of the method call. In some instances, these results might not be what you anticipated when you called the method; by checking the return value, you can determine what actually happened. For example, the return value might indicate:

The value that was actually set. For example, not all Players can present media data at five times the normal rate. If you call setRate(5.0), the Player will set its rate as close as it can to 5.0 and return the rate it actually set. That rate might be 5.0, or it might be 1.0; you need to check the return value to find out.

That the information you requested is not currently available. For example, a Player might not know its duration until it has played its media stream once. If you call getDuration on such a Player before it has played, getDuration returns DURATION_UNKNOWN. ff you call getDuration again after the Player has played, it might be able to return the actual duration of the media stream.

2.0 Example: Creating an Applet to Play a Media File

The sample program PlayerApplet demonstrates how to create a Java Media Player and present an MPEG movie from within a Java applet. This is a general example that could easily be adapted co present other types of media streams.

The Player's visual presentation and its controls are displayed within the applet's presentation space in the browser window. If you create a Player in a Java application, you are responsible for creating the window to display the Player's components.

Note: While PlayerApplet illustrates the basic usage of a Java Media Player, it does not perform the error handling necessary in a real applet or application. For a more complete sample suitable for use as a template, see "Appendix A: Java Media Applet" on page 37.

2.1 Overview of PlayerApplet

The APPLET tag is used to invoke PlayerApplet in an HTML file. The WIDTH and HEIGHT fields of the HTML APPLET tag determine the dimensions of the applet's presentation space in the browser window. The PARAM tag identifies the media file to be played. For example, PlayerApplet could be invoked with:

```
<APPLET CODE=ExampleMedia.PlayerApplet
    WIDTH=320 HEIGHT=300>
<PARAM NAME=FILE VALUE="Astrnmy.mpg">
</APPLET>
```

When a user opens a web page containing PlayerApplet, the applet loads automatically and runs in the specified presentation space, which contains the Player's visual component and default controls. The Player starts and plays the MPEG movie once. The user can use the default Player controls to stop, restart, or replay the movie. If the page containing the applet is closed while the Player is playing the movie, the Player automatically stops and frees the resources it was using.

To accomplish this, PlayerApplet extends Applet and implements the ControllerListener interface. PlayerApplet defines five methods:

- init—creates a Player for the file that was passed in through the PARAM tag and registers PlayerApplet as a controller listener so that it can observe media events posted by the Player. (This causes PlayerApplet's controller Update method to be called whenever the Player posts an event.)
- start—starts the Player when PlayerApplet is started.
- stop—stops and deallocates the Player when PlayerApplet is stopped.
- destrcy—closes the Player when PlayerApplet is removed.
- controllerUpdate—responds to Player events to display the Player's components.

2.2 PlayerApplet Code Listing

```
PlayerApplet.java:
package ExampleMedia;
import java.applet.*;
import java.awt.*;
import java.net.*;
import javax.media.*;
public class PlayerApplet extends Applet implements ControllerListener {
    Player player = null;
    public void init( ) {
        setLayout(new BorderLayout( ));
        String mediaFile = getParameter("FILE");
        try {
            URL mediaURL = new URL(getDocumentBase( ), mediaFile);
            player = Manager.createPlayer(mediaURL);
            player.addControllerListener(this);
        }
        catch (Exception e) {
            System.err.println("Got exception "+e)
        }
    }
    public void start( ) {
        player.start( );
    }
    public void stop( ) {
        player.stop( );
        player.deallocate( );
    }
    public void destroy( ) {
        player.close( );
    }
    public synchronized void controllerUpdate(ControllerEvent event) {
        if (event instanceof RealizeCompleteEvent) {
            Component comp;
            if ((comp = player.getVisualComponent( )) != null)
                add ("Center", comp);
            if ((comp = player.getControlPanelComponent( )) != null)
                add ("South", comp);
            validate( );
        }
    }
}
```

2.3 Initializing the Applet

When a Java applet starts, its init method is invoked automatically. You override init to prepare your applet to be started. PlayerApplet performs four tasks in init:

1. Retrieves the applet's FILE parameter.
2. Uses the FILE parameter to locate the media file and build a URL object that describes that media file.
3. Creates a Player for the media file by calling Manager.createPlayer.
4. Registers the applet as a controller listener with the new Player by calling addControllerListener. Registering as a listener causes PlayerApplet's controllerUpdate method to be called automatically whenever the Player posts a media event. The Player posts media events whenever its state changes. This mechanism allows you to control the Player's transitions between states and ensure that the Player is in a state in which it can process your requests. (For more information, see "Player States" on page 6.)

```
public void init( ) {
    setLayout(new BorderLayout( ));
    // 1. Get the FILE parameter.
    String mediaFile = getParameter("FILE");
    try {
        // 2. Create a URL from the FILE parameter. The URL
        // class is defined in java.net.
        URL mediaURL = new URL(getDocumentBase( ), mediaFile);
        // 3. Create a player with the URL object.
        player = Manager.createPlayer(mediaURL);
        // 4. Add PlayerApplet as a listener on the new player.
        player.addControllerListener(this);
    }
    catch (Exception e) {
        System.err.println("Got exception "+e);
    }
}
```

2.4 Controlling the Player

The Applet class defines start and stop methods that are called automatically when the page containing the applet is opened and closed. You override these methods to define what happens each time your applet starts and stops.

PlayerApplet implements start to start the Player whenever the applet is started:

```
public void start( ) {
    player.start( );
}
```

Similarly, PlayerApplet overrides stop to stop and deallocate the Player:

```
public void stop( ) {
    player.stop( );
    player.deallocate( );
}
```

Deallocating the Player releases any resources that would prevent another Player from betng started. For example, if the Player uses a hardware device to present its media, deallocate frees that device so that other Players can use it.

When an applet exits, destroy is called to dispose of any resources created by the applet. PlayerApplet overrides destroy to close the Player. Closing a Player releases all of the resources that it's using and shuts it down permanently.

```
public void destroy( ) {
    player.close( );
}
```

2.5 Responding to Media Events

PlayerApplet registers itself as a ControllerListener in its init method so that it receives media events from the Player. To respond to these events, PlayerApplet implements the controllerUpdate method, which is called automatically when the Player posts an event.

PlayerApplet responds to one type of event, RealizeCompleteEvent. When the Player posts a RealizeCompleteEvent, PlayerApplet displays the Player's components:

```
public synchronized void controllerUpdate(ControllerEvent event)
{
    if (event instanceof RealizeCompleteEvent) {
        Component comp;
        if ((comp = player.getVisualComponent( )) != null)
            add ("Center", comp);
        if ((comp = player.getControlPanelComponent( )) != null)
            add ("South", comp);
        validate( );
    }
}
```

A Player's user-interface components cannot be displayed until the Player is Realized; an Unrealized Player doesn't know enough about its media stream to provide access to its user-intertace components. PlayerApplet waits for the Player to post a RealizeCompleteEvent and then displays the Player's visual component and default control panel by adding them to the applet container. Calling validate triggers the layout manager to update the display to include the new components.

3.0 Creating and Displaying a Player

You create a Player indirectly through the media Manager. To display the Player, you get the Player's components and add them to the applet's presentation space or application window.

3.1 Creating a Player

When you need a new Player, you request it from the Manager by calling createPlayer. The Manager uses the media URL or MediaLocator that you specify to create an appropriate Player.

A URL can only be successfully constructed if the appropriate corresponding URL-StreamHandler is installed. MediaLocator doesn't have this restriction.

This level of indirection allows new Players to be integrated seamlessly. From the client perspective, a new Player is always created the same way, even though the Player might actually be constructed from interchangeable parts or dynamically loaded at runtime.

3.2 Displaying a Player and Player Controls

JMF specifies the timing and rendering model for displaying a media stream, but a Player's interface components are actually displayed using java.awt, Java's core package for screen display. A Player can have two types of AWT components, its visual component and its control components.

3.2.1 Displaying a Player's Visual Component

The component in which a Player displays its media data is called its visual component. Even an audio Player might have a visual component, such as a waveform display or animated character.

To display a Player's visual component, you:

1. Get the component by calling getVisualComponent.
2. Add it to the applet's presentation space or application window.

You can access the Player's display properties, such as its x and y coordinates, through its visual component. The layout of the Player components is controlled through the AWT layout manager.

3.2.2 Displaying a Player's Controls

A Player often has a control panel that allows the user to control the media presentation. For example, a Player might be associated with a set of buttons to start, stop, and pause the media stream, and with a slider control to adjust the volume.

Every Java Media Player provides a default control panel. To display a Player's default control panel, you get it by calling getControlPanel Component and add it to the applet's presentation space or application window. If you prefer to define a custom user-interface, you have access to the interfaces through which the standard control panel is implemented.

A Player 's control-panel component often interacts with both the Player and the Player's controls. For example, to star and stop the Player or set its media time, the control panel calls the Player directly. But many Players have other properties that can be managed by the user. For example, a video Player might allow the user to adjust brightness and contrast, which are not managed through the Player interface. To handle these types of controls, JMF defines the Control interface.

A media Player can have any number of Control objects that define control behaviors and have corresponding user interface components. You can get these controls by calling getcontrol s on the Player. For example, to determine if a Player supports the CachingControl interface and get the CachingControl if it does, you can call getControls:

```
Control[ ] controls = player.getControls( );
    for (int i = 0; i < controls.length; i++) {
        if (controls[i] instanceof CachingControl) {
            cachingControl = (CachingControl) controls[i];
        }
    }
```

What controls are supported by a particular Player depends on the Player implementation.

3.2.3 Displaying a Gain Control Component

GainControl extends the Control interface to provide a standard API for adjusting audio gain. To get this control, you must call getGainControl; getControls does not return a Player's GainControl. GainControl provides methods for adjusting the audio volume, such as setLevel and setMute. Like other controls, the GainControl is associated with a GUI component that can be added to an applet's presentation space or an application window.

3.2.4 Displaying a Player's Download Progress

Downloading media data can be a time consuming process. In cases where the user must wait while data is downloaded, a progress bar is often displayed to reassure the user that the download is proceeding and to give some indication of how long the process will take. The CachingControl interface is a special type of Control supported by Players that can report their download progress. You can use this interface to display a download progress bar to the user.

You can call getControls to determine whether or not a Player supports the CachingControl interface. If it does, the Player will post a CachingControlEvent whenever the progress bar needs to be updated. If you implement your own progress bar component, you can listen for this event and update the download progress whenever CachingControlEvent is posted.

A CachingControl also provides a default progress bar component that is automatically updated as the download progresses. To use the default progress bar in an applet:

1. Implement the ControllerListener interface and listen for CachingControlEvents in controllerUpdate.
2. The first time you receive a CachingControlEvent:
   a. Call getCachingControl on the event to get the caching control.
   b. Call getProgressBar on the CachingControl to get the default progress bar component.
   c. Add the progress bar component to the applet's presentation space.
3. Each time you receive a CachingControlEvent, check to see if the download is complete. When getContentProgress returns the same value as getContentLength, remove the progress bar.

4.0 Controlling Media Players

The Clock and Player interfaces define the methods for starting and stopping a Player.

4.1 Starting a Player

You typically start a Player by calling start. The start method tells the Player to begin presenting media data as soon as possible. If necessary, start prepares the Player to start by performing the realize and prefetch operations. If start is called on a Started Player, the only effect is that a StartEvent is posted in acknowledgment of the method call.

Clock defines a syncStart method that can be used for synchronization. See "Synchronizing Players" on page 27 for more information.

To start a Player at a specific point in a media stream:
1. Specify the point in the media stream at which you want to start by calling setMediaTime.
2. Call start on the Player.

4.2 Stopping a Player

There are four situations in which a Player will stop:
When the stop method is called on the Player.
When the Player has reached the specified stop time.
When the Player has run out of media data.
When the Player is receiving data too slowly to allow acceptable playback.

When a non-broadcast Player is stopped, its media rime is frozen. If the Stopped Player is subsequently restarted, media time resumes from the stop time. When you stop a broadcast Player, only the receipt of the media data is stopped; the data continues to be broadcast. When you restart a broadcast Player, the playback will resume wherever the broadcast is at that point in time.

You use the stop method to stop a Player immediately. If you call stop on a Stopped Player, the only effect is that a StopByRequestEvent is posted in acknowledgment of the method call.

4.2.1 Stopping a Player at a Specified Time

You can call setStopTime to indicate when a Player should stop. The Player stops when its media time passes the specified stop time. If the Player's rate is positive, the Player stops when the media time becomes greater than or equal to the stop time. If the Player's rate is negative, the Player stops when the media time becomes less than or equal to the stop time. The Player stops immediately if its current media time is already beyond the specified stop time.

For example, assume that a Player's media time is 5.0 and setStopTime is called to set the stop time to 6.0. If the Player's rate is positive, media time is increasing and the Player will stop when the media time becomes greater than or equal to 6.0. However, if the Player's rate is negative, it is playing in reverse and the Player will stop immediately because the media time is already beyond the stop time. (For more information about Player rates, see "Setting a Player's Rate" on page 26.)

You can always call setStopTime on a stopped Player. However, you can only set the stop time on a Starred Player if the stop time is not currently set. If the Player already has a stop time, setStopTime throws an error.

You can call getStopTime to get the currently scheduled stop time. If the clock has no scheduled stop time, getStop- Time returns Clock.UNSET. To remove the stop time so that the Player continues until it reaches end-of-media, call setStopTime(UNSET).

5.0 Managing Player States

The transitions between states are controlled with five methods:
realize
prefetch
start
deallocate
stop
close By controlling when these methods are called, you can manage the state of a Player. For example, you might want to minimize start-latency by preparing the Player to start before you actually start it.

You can implement the ControllerListener interface to manage these control methods in response to changes in the Player's state. Listening for a Player's state transitions is also important in other cases. For example, you cannot get a Player's components until the Player has been Realized. By listening for a RealizeCompleteEvent you can get the components as soon as the Player is Realized.

5.1 Preparing a Player to Start

Most media Players cannot be started instantly. Before the Player can start, certain hardware and software conditions must be met. For example, if the Player has never been started, it might be necessary to allocate buffers in memory to store the media data. Or, if the media data resides on a network device, the Player might have to establish a network connection before it can download the data. Even if the Player has been started before, the buffers might contain data that is not valid for the current media position.

5.1.1 Realizing and Prefetching the Player

JMF breaks the process of preparing a Player to start into two phases, Realizing and Preferching. Realizing and Preferching a Player before you start it minimizes the time it takes the Player to begin presenting media when start is called and helps create a highly-responsive interactive experience for the user. Implementing the ControllerListener interface allows you to control when these operations occur.

You call realize to move the Player into the Realizing state and begin the realization process. You call prefetch to move the Player into the Preferching state and initiate the prefetching process. The realize and prefetch methods are asynchronous and return immediately. When the Player completes the requested operation, it posts a RealizeCompleteEvent or PrefetchCompleteEvent. "Player States" on page 6 describes the operations that a Player performs in each of these states.

A Player in the Prefetched state is prepared to start and its start-up latency cannot be further reduced. However, setting the media time through setMediaTime might return the Player to the Realized state, increasing its start-up latency.

Keep in mind that a Prefetched Player ties up system resources. Because some resources, such as sound cards, might only be usable by one program at a time, this might prevent other Players from starting.

5.1.2 Blocking until a Player is Realized

Many of the methods that can be called on a Player require that the Player be in the Realized state. One way to guarantee that a Player is Realized when you call these methods is to implement a method that calls realize and blocks until the Player posts a RealizeCompleteEvent.

Note: Be aware that blocking on realize can produce unsatisfactory results. For example, if an applet blocks while a Player is realizing, Applet.start and Applet.stop will not be able to interrupt the process.

To block until a Player is Realized, you could implement a method called blockingRealize that calls realize on your Player and returns when the Player posts a RealizeCompleteEvent and your controllerUpdate method is called. This requires that you implement the ControllerListener interface and register as a listener with the Player. If you register as a listener with multiple Players, your controllerupdate method needs to determine which Player posted the RealizeCompleteEvent.[1]

1. This example code is used with the permission of Bill Day and JavaWorld magazine. The blockingRealize example code was first published by Bill Day in "Java Media Framework Player API: Multimedia Comes to Java" in JavaWorld magazine, an online publication of Web Publishing Inc., April 1997. Please see http://www.javaworld.com/javaworld/jw-04-1997/jw-04-jmf.html for the complete article, example code listing, and demonstration applets.

```
boolean realized = false;
public synchronized void blockingRealize( )
{
    myPlayer.realize( );
    while (!realized) {
        try {
            wait( );
        }
        catch (java.lang.InterruptedException e) {
            status.setText("Interrupted while waiting on
                    realize...exiting.");
            System.exit(1);
        }
    }
}
public synchronized void controllerUpdate (ControllerEvent event)
{
    if (event instanceof RealizeCompleteEvent) {
        realized = true;
        notify( );
    }
    else if (event instanceof EndOfMediaEvent) {
        eomReached = true;
    }
}
```

5.1.3 Determining a Player's Start-up Latency

To determine how much time is required to start a Player, you can call getStartLatency. For Players that have a variable start latency, the return value of getStartLatency represents the maximum possible start latency. For some media types, getStartLatency might return LATENCY_UNKNOWN.

The start-up latency reported by getStartLatency might differ depending on the Player's current state. For example, after a prefetch operation, the value returned by getStartLatency is typically smaller. A Controller that can be added to a Player will return a useful value once it is Prefetched. (For more information about added Controllers, see "Using a Player to Manage and Synchronize other Controllers" on page 29.)

5.2 Starting and Stopping a Player

Calling start moves a Player into the Started state. As soon as start is called, methods that are only legal for stopped Players cannot be called until the Player has been stopped.

If start is called and the Player has not been prefetched, start performs the realize and prefetch operations as needed to move the Player into the Prefetched state. The Player posts transition events as it moves through each state.

When stop is called on a Player, the Player is considered to be stopped immediately; stop is synchronous. However, a Player can also stop asynchronously when:

The end of the media stream is reached.

The stop time previously set with setStopTime is reached.

The Player is data starved.

When a Player stops, it posts a StopEvent. To determine why the Player stopped, you must listen for the specific stop events: DeallocateEvent, EndOfMediaEvent, RestartingEvent, StopAtTimeEvent, StopByRequestEvent, and DataStarvedEvent.

5.3 Releasing Player Resources

The deallocate method tells a Player to release any exclusive resources and minimize its use of non-exclusive resources. Although buffering and memory management requirements for Players are not specified, most Java Media Players allocate buffers that are large by the standards of Java objects. A well-implemented Player releases as much internal memory as possible when deallocate is called.

The deallocate method can only be called on a Stopped Player. To avoid ClockStartedErrors, you should call stop before you call deallocate. Calling deallocate on a Player in the Prefetching or Prefetched state returns it to the Realized state. If deallocate is called while the Player is realizing, the Player posts a DeallocateEvent and returns to the Unrealized state. (Once a Player has been realized, it can never return to the Unrealized state.)

You generally call deal locate when the Player is not being used. For example, an applet should call deallocate as part of its stop method. By calling deallocate, the program can maintain references to the Player, while freeing other resources for use by the system as a whole. (JMF does not prevent a Realized Player that has formerly been Prefetched or Started from maintaining information that would allow it to be started up more quickly in the future.)

When you are finished with a Player (or other Controller) and are not going to use it anymore, you should call close. The close method indicates that the Controller will no longer be used and can shut itself down. Calling close releases all of the resources that the Controller was using and causes the it to cease all activity. When a Controller is closed, it posts a ControllerClosedEvent. A closed Controller cannot be reopened and invoking methods on a closed Controller might generate errors.

5.4 Implementing the ControllerListener Interface

ControllerListener is an asynchronous interface for handling events generated by Controller objects. Using the ControllerListener interface enables you to manage the timing of potentially time-consuming Player operations such as prefetching.

To implement the ControllerListener interface, you need to:

1. Implemenc the ControllerListener interface in a class.
2. Register that class as a listener by calling addControllerListener on the Controller that you want to receive events from.

When a Controller posts an event, it calls controllerupdate on each registered listener. Typically, controllerUpdate is implemented as a series of if-else statements of the form:

```
if(event instanceof EventType) {
...
} else if(event instanceof OtherEventType) {
...
}
```

This filters out the events that you are not interested in. If you have registered as a listener with multiple Controllers, you also need to determine which Controller posted the event. ControllerEvents come "stamped" with areference to their source that you can access by calling getSource.

"Appendix D: ControllerAdapter" on page 67 provides the source for an implementation of ControllerListener that can be easily extended to respond to particular Events.

When you receive events from a Controller, you might need to do some additional processing to ensure that the Controller is in the proper state before calling a control method. For example, before calling any of the methods that are restricted to Stopped Players, you should check the Player's target state by calling getTargetState. If start has been called, the Player is considered to be in the Started state, though it might be posting transition events as it prepares the Player to present media.

Some types of ControllerEvents are stamped with additional state information. For example, the StartEvent and StopEvent classes each define a method that allows you to retrieve the media time at which the event occurred.

6.0 Managing Timing

In many cases, instead of playing a single media stream from beginning to end, you want to play a portion of the stream or synchronize the playback of multiple streams. The JMF TimeBase and Clock interfaces define the mechanism for managing the timing and synchronization of media playback.

A TimeBase represents the flow of time. A time-base time cannot be transformed or reset. A Java Media Player uses its TimeBase to keep time in the same way that a quartz watch uses a crystal that vibrates at a known frequency to keep time. The system maintains a master TimeBase that measures time in nanoseconds from a specified base time, such as Jan. 1, 1970. The system TimeBase is driven by the system clock and is accessible through the Manager.getSystemTimeBase method.

A Player's media time represents a point in time within the stream that the Player is presenting. The media time can be started, stopped, and reset much like a stopwatch.

A Clock defines the mapping between a TimeBase and the media time.

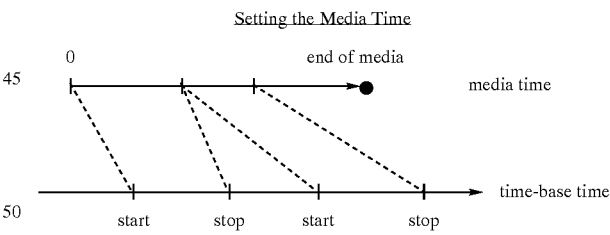

Setting the Media Time

A Java Media Player can answer several timing queries about the media source it is presenting. Of course, timing information is subject to the physical characteristics and limitations of both the media source and of the network device on which it is stored.

A Time object represents a quantity of some time unit, such as nanoseconds. You use Time objects when you query or set a Player's timing information.

6.1 Setting the Media Time

Setting a Player's media time is equivalent to setting a read position within a media stream. For a media data source such as a file, the media time is bounded; the maximum media time is defined by the end of the media stream.

To set the media time you call setMediaTime and pass in a Time object that represents the time you want to set.

6.2 Getting the Current Time

Calling getMediaTime returns a Time object that represents the Player's current media time. If the Player is not presenting media data, this is the point from which media presentation will commence. There is not a one-to-one correspondence between a media time and a particular frame. Each frame is presented for a certain period of time, and the media time continues to advance during that period.

For example, imagine you have a slide show Player that displays each slide for 5 seconds—the Player essentially has a frame rate of 0.2 frames per second.

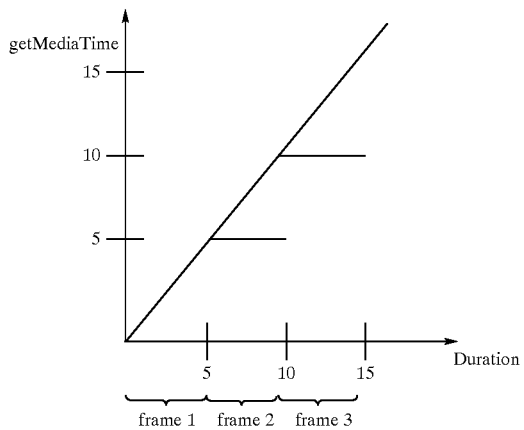

If you start the Player at time 0.0, while the first frame is displayed, the media time advances from 0.0 to 5.0. If you start at time 2.0, the first frame is displayed for 3 seconds, until time 5.0 is reached.

You can get a Player's current time-base time by getting the Player's TimeBase and calling getRefTime:

myCurrentTBTime=player1.getTimeBase( ).getRefTime( );

When a Player is running, you can get the time-base time that corresponds to a particular media time by calling mapToTimeBase.

6.3 Setting a Player's Rate

The Player's rate determines how media time changes with respect to time-base time; it defines how many units a Player's media time advances for every unit of time-base time. The Player's rate can be thought of as a temporal scale factor. For example, a rate of 2.0 indicates that media time passes twice as fast as the time-base time when the Player is started.

In theory, a Player's rate could be set to any real number, with negative rates interpreted as playing the media in reverse. However, some media formats have dependencies between frames that make it impossible or impractical to play them in reverse or at non-standard rates.

When setRate is called on a Player, the method returns the race that is actually set, even if it has not changed. Players are only guaranteed to support a rate of 1.0.

6.4 Getting a Player's Duration

Since your program might need to determine how long a given media stream will run, all Controllers implement the Duration interface. This interface comprises a single method, getDuration. Duration represents the length of time that a media object would run, if played at the default rate of 1.0. A media stream's duration is accessible only through the Player.

If the duration can't be determined when getDuration is called, DURATION_UNKNOWN is returned. This can happen if the Player has not yet reached a state where the duration of the media source is available. At a later time, the duration might be available and a call to getDuration would return the duration value. If the media source does not have a defined duration, as in the case of a live broadcast, getDuration returns DURATION_UNBOUNDED.

7.0 Synchronizing Players

To synchronze the playback of multiple media streams, you can synchronize the Players by associating them with the same TimeBase. To do this, you use the getTimeBase and setTimeBase methods defined by the Clock interface. For example, you could synchronize player1 with player2 by setting player1 to use player2's time base:

player1.setTimeBase(player2. getTimeBase( ));

When you synchronize Players by associating them with the sameTimeBase, you must still manage the control of each Player individually. Because managing synchronized Players in this way can be complicated, JMF provides a mechanism that allows a Player to assume control over any Controller. The Player manages the states of the controllers automatically, allowing you to interact with the entire group through a single point of control. For more information, see "Using a Player to Manage and Synchronize other Controllers" on page 29.

In a few situations, you might want to manage the synchronization of multiple Players yourself so that you can control the rates or media times independently. If you do this, you must:

Register as a listener for each synchronized Player.

Determine which Player's time base is going to be used to drive the other Players and set the time base for the synchronized Players. Not all Players can assume a new time base. For example, if one of the Players you want to synchronize has a push data-source, chat Player's time base must be used to drive the other Players.

Set the rate for all of the Players. If a Player cannot support the rate you specify, it returns the rate that was used. (There is no mechanism for querying the rates that a Player supports.)

Synchronize the Players' states. (For example, stop all of the Players.)

Synchronize the operation of the Players:
Set the media time for each Player.
Prefetch all of the Players.
Determine the maximum start latency among the synchronized Players.
Start the Players by calling syncStart with a time that takes into account the maximum latency.

You must listen for transition events for all of the Players and keep track of which ones have posted events. For example, when you prefetch the Players, you need to keep track of which ones have posted PrefetchComplete events so that you can be sure all of the Players are Prefetched before calling syncStart. Similarly, when you request that the synchronized Players stop at a particular time, you need to listen for the stop event posted by each Player to determine when all of the Players have actually stopped.

In some situations, you need to be careful about responding to events posted by the synchronized Players. To be sure of the Players' states, you might need to wait at certain stages for all of the synchronized Players to reach the same state before continuing.

For example, assume that you are using one Player to drive a group of synchronized Players. A user interacting with that Player sets the media time to 10, starts the Player, and then changes the media time to 20. You then:

Pass along the first setMediaTime call to all of the synchronized Players.

Call prefetch on the Players to prepare them to start.

Call stop on the Players when the second set media time request is received.

Call setMediaTime on the Players with the new time.

Restart the prefetching operation.

When all of the Players have been prefetched, start them by calling syncStart, taking into account their start latencies.

In this case, simply listening for PrefetchComplete events from all of the Players before calling syncStart isn't sufficient. You can't tell whether those events were posted in response to the first or second prefetch operation. To avoid this problem, you can block when you call stop and wait for all of the Players to post stop events before continuing. This guarantees that the next PrefetchComplete events you receive are the ones that you are really interested in.

8.0 Using a Player to Manage and Synchronize other Controllers

Synchronizing Players manually using syncStart requires that you carefully manage the states of all of the synchronized Players. You must control each one individually, listening for events and calling control methods on them as appropriate. Even with only a few Players, this quickly becomes a difficult task. Through the Player interface, JMF provides a simpler solution: a Player can be used to manage the operation of any Controller.

When you interact with a managing Player, your instructions are automatically passed along to the managed Controllers as appropriate. The managing Player takes care of the state management and synchronization for all of the other Controllers.

This mechanism is implemented through the addController and removeController methods. When you call addController on a Player, the Controller you specify is added to the list of Controllers managed by the Player. Conversely, when you call removeController, the specified Controller is removed from the list of managed Controllers.

Typically, when you need to synchronize Players or other Controllers, you should use this addController mechanism. It is simpler, faster, and less errorprone than attempting to manage synchronized Players individually.

When a Player assumes control of a Controller:

The Controller assumes the Player's time-base.

The Player's duration becomes the longer of the Controller's duration and its own. If multiple Controllers are placed under a Player's control, the Player's duration is the longest of all of their durations.

The Player's start latency becomes the longer of the Controller's start latency and its own. If multiple Controllers are placed under a Player's control, the Player's start latency is the longest of all of their latencies.

A managing Player only posts completion events for asynchronous methods after every added Controller has posted the event. The managing Player reposts other events generated by the managed Controllers as appropriate.

8.1 Adding a Controller

You use the addController method to add a Controller to the list of Controllers managed by a particular Player. To be added, a Controller must be in the Realized state; otherwise, a NotRealizedError is thrown. Two Players cannot be placed under control of each other. For example, if player1 is placed under the control of player2, player2 cannot be placed under the control of player1 without first removing player1 from player2's control.

Once a Controller has been added to a Player, do not call methods directly on the added Controller. To control an added Controller, you interact with the managing Player.

To have player2 assume control of player1, call:

player2.addController(player1).

8.2 Managing the Operation of Added Controllers

To control the operation of a group of Controllers managed by a particular Player, you interact directly with the managing Player. Do not call control methods on the managed Controllers directly.

For example, to prepare all of the managed Controllers to start, call prefetch on the managing Player. Similarly, when you want to start them, call start on the managing Player. The managing Player makes sure that all of the Controllers are Prefetched, determines the maximum start latency among the Controllers, and calls syncStart to start them, specifying a time that takes the maximum start latency into account.

When you call a Controller method on the managing Player, the Player propagates the method call to the managed Controllers as appropriate. Before calling a Controller method on a managed Controller, the Player ensures that the Controller is in the proper state. The following table describes what happens to the managed Controllers when you call control methods on the managing Player.

| Function | Stopped Player | Started Player |
| --- | --- | --- |
| setMediaTime | Invokes setMediaTime on all managed Controllers. | Stops all managed Controllers, invokes setMediaTime, and restarts Controllers. |
| setRate | Invokes setRate on all managed Controllers. Returns the actual rate that was supported by all Controllers and set. | Stops all managed Controllers, invokes setRate, and restarts Controllers. Returns the actual rate that was supported by all Controllers and set. |
| start | Ensures all managed Controllers are Prefetched and invokes syncStart on each of them, taking into account their start latencies. | Depends on the Player implementation. Player might immediately post a StartEvent. |
| realize | The managing Player immediately posts a RealizeCompleteEvent. To be added, a Controller must already be realized. | The managing Player immediately posts a RealizeCompleteEvent. To be added, a Controller must already be realized. |

-continued

| Function | Stopped Player | Started Player |
| --- | --- | --- |
| prefetch | Invokes prefetch on all managed Controllers. | The managing Player immediately posts a PrefetchCompleteEvent, indicating that all managed Controllers are Prefetched. |
| stop | No effect. | Invokes stop on all managed Controllers. |
| deallocate | Invokes deallocate on all managed Controllers. | It is illegal to call deallocate on a Started Player. |
| setStopTime | Invokes setStopTime on all managed Controllers. (Player must be Realized) | Invokes setStopTime on all managed Controllers. (Can only be set once on a Started Player) |
| syncStart | Invokes syncStart on all managed Controllers. | It is illegal to call syncStart on a Started Player. |
| close | Invokes close on all managed Controllers. | It is illegal to call close on a Started Player. |

8.3 Removing a Controller

You use the removecontroler method to remove a Controller from the list of controllers managed by a particular Player.

To have player2 release control of player1, call:

player2. removeController(player1):

9.0 Extending JMF

The JMF architecture allows advanced developers to create and integrate new types of controllers and data sources. For example, you might implement a new Player that supports a special media formnat.

This section introduces the JMF Player architecture and describes how new Players and DataSources can be integrated into JMF.

9.1 Understanding the Player Architecture

As described in "Creating a Player" on page 14. a client programmer calls Manager.createPlayer to get a new Player for a particular media source. When createPlayer is called, an appropriate Player is created and returned to the caller.

Manager constructs Players for particular media sources. A DataSource is first constructed from a URL or MediaLocator and then used to create a Player. (A DataSource is a protocol-specific source of media data. Players usually use DataSources to manage the transfer of media-content.)

When creating a Player, Manager:

Obtains the connected DataSource for the specified protocol

Obtains the Player for the content-type specified by the DataSource

Attaches the DataSource to the Player

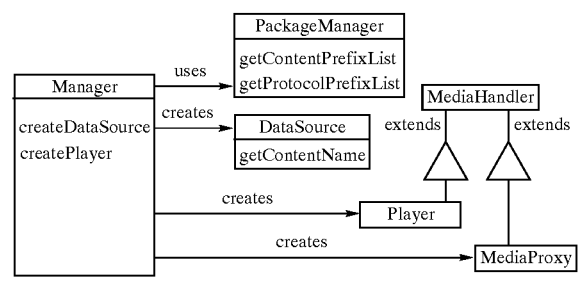

9.1.1 Locating a DataSource

The createDataSource method locates and instantiates an appropriate DataSource for a specified MediaLocator. To do this, it first creates a search list of DataSource class names and then steps through each class in the list until a usable data source is found. To construct the search list of DataSource class names, createDataSource:

1. Obtains a vector of protocol package-prefixes from PackageManager.
2. Adds a class name of the form:
   <package-prefix>.media.protocol.<protocol>.DataSource for each <package-prefix> in the protocol package-prefix-vector.

Manager steps through each class in the list until it finds a DataSource that it can instantiate and to which it can attach the MediaLocator.

9.1.2 Locating a Player

The createPlayer method uses a similar mechanism to locate and instantiate an appropriate Player for a particular DataSource. A Player is a type of MediaHandler, an object that reads data from a DataSource. MediaHandlers are identified by the content type that they support. Manager uses the content type name obtained from a DataSource to find MediaHandler objects. JMF supports two types of MediaHandlers, Player and MediaProxy.

A MediaProxy processes content from one DataSource to create another. Typically, a MediaProxy reads a text configuration file that contains all of the information needed to make a connection to a server and obtain media data.

When createPlayer is called, Manager first creates a search list of class names using the content name from the DataSource and the list of installed packages returned by the PackageManager. It then steps through each class in the list until it finds a MediaHandler that can be constructed and to which it can attach the DataSource.

If the MediaHandler is a Player, the process is finished and Manager returns the new Player. If the MediaHandler is a MediaProxy, Manager obtains a new DataSource from the MediaProxy, creates a new list for the content type that the DataSource supports and repeats the search process.

If an appropriate Player cannot be found, the procedure is repeated, substituting "unknown" for the content type name. The "unknown" content type is supported by generic Players that are capable of handling a large variety of media types, often in a platform dependent way.

To construct the search list of MediaHandler class names, createPlayer:

1. Obtains a vector of content package-prefixes from PackageManager.
2. Adds a class name of the form:
   <package-prefix>.media.content.<content-type>.Handler for each <package-prefix> in the content package-prefix-vector.

9.2 Integrating a New Player Implementation

You can create custom implementations of Player that can work seamlessly with the rest of JMF. To integrate a Player with JMF, you need to:

Implement Player. setSource to check the DataSource and determine whether or not the Player can handle that type of source. When the client programmer calls createPlayer, setSource is called as the Manager searches for an appropriate Player.

Install the package containing the new Player class.

Add the package prefix to the content package-prefix list controlled by the PackageManager. The Manager queries the PackageManager for the list of content package-prefixes it uses to search for a Player.

For example, to integrate a new Player for the content type mpeg.sys, you would create and install a package called:

<package-prefix>.media.content.mpeg.sys that contains the new Player class. The package prefix is an identifier for your code, such as COM.yourbiz. Your installation program also needs to add your package prefix to the content package-prefix list managed by the PackageManager.

---

```
Vector packagePrefix = PackageManager.getContentPrefixList( );
string myPackagePrefix = new String("COM.yourbiz");
// Add new package prefix to end of the package prefix list.
packagePrefix.addElement(myPackagePrefix);
PackageManager.setContentPrefixList( );
// Save the changes to the package prefix list.
PackageManager.commitContentPrefixList( );
```

---

9.3 Implementing a New Data Source

A DataSource is an abstraction of a media protocol-handler. You can implement new types of DataSources to support additional protocols by extending PullDataSource or PushDataSource. If your DataSource supports changing the media position within the stream to a specified time, it should implement the Positionable interface. If the DataSource supports seeking to a particular point in the stream, the corresponding SourceStreamn should implement the Seekable interface.

A DataSource manages a collection of SourceStreams. A PullDataSource only supports pull data-streams; it manages acollection of PullSourceStreams. A PushDataSource only supports push data-streams; it manages a collection of PushSourceStreams. When you implement a new DataSource, you also need to implement the corresponding source stream, PullSourceStream or PushSourceStream.

See "Appendix B: Sample Data Source Implementation" on page 43 for an example illustrating how a new PullDataSource, FTPDataSource, could be implemented.

9.4 Integrating a New Data Source Implementation

The mechanism for integrating a custom DataSource implementation with JMF is similar to the one used for integrating a Player. You need to:

Install the package containing the new DataSource class.

Add the package prefix to the protocol package-prefix list controlled by the PackageManager. The Manager queries the PackageManager for the list of protocol package prefixes it uses to search for a DataSource.

Appendix A: Java Media Applet

This Java Applet demonstrates proper error checking in a Java Media program. Like PlayerApplet, it creates a simple media player with a media event listener.

When this applet is started, it immediately begins to play the media clip. When the end of media is reached, the clip replays from the beginning.

---

```
import java.applet.Applet;
import java.awt.*;
import java.lang.String;
import java.net.URL;
import java.net.MalformedURLException;
import java.io.IOException;
import javax.media.*;
/**
* This is a Java Applet that demonstrates how to create a simple
* media player with a media event listener. It will play the
* media clip right away and continuously loop.
*
* <!-- Sample HTML
* <applet code=TypicalPlayerApplet width=320 height=300>
* <param name=file value="Astrnmy.avi">
* </applet>
* -->
*/
public class TypicalPlayerApplet extends Applet implements
ControllerListener
{
    // media player
    Player player = null;
    // component in which video is playing
    Component visualComponent = null;
```

```
// controls gain, position, start, stop
Component controlComponent = null;
// displays progress during download
Component progressBar    = null;
/**
Read the applet file parameter and create the media
* player.
*/
public void init()
{
    setLayout(new Borderlayout());
    // input file name from html param
    String mediaFile = null;
    // URL for our media file
    URL url = null;
    // URL for doc containing applet
    URL codeBase = getDocumentBase();
    // Get the media filename info.
    // The applet tag should contain the path to the
    // source media file, relative to the html page.
    if ((mediaFile = getParameter("FILE")) == null)
        Fatal("Invalid media file parameter");
    try
    {
        // Create an url from the file name and the url to the
        // document containing this applet.
        if ((url = new URL(codeBase, mediaFile)) == null)
            Fatal("Can't build URL for " + mediaFile);
        // Create an instance of a player for this media
        if ((player = Manager.createPlayer(url)) == null)
            Fatal("Could not create player for "+url);
        // Add ourselves as a listener for player's events
            player.addControllerListener(this);
    }
    catch (MalformedURLException u)
    {
        Fatal("Invalid media file URL!");
    }
    catch(IOException i)
    {
        Fatal("IO exception creating player for "+url);
    }
    // This applet assumes that its start() calls
    // player.start().This causes the player to become
    // Realized. Once Realized, the Applet will get
    // the visual and control panel components and add
    // them to the Applet. These components are not added
    // during init() because they are long operations that
    // would make us appear unresposive to the user.
}
/**
* Start media file playback. This function is called the
* first time that the Applet runs and every
* time the user re-enters the page.
*/
public void start()
{
    // Call start() to prefetch and start the player.
    if (player != null) player.start();
}
/**
* Stop media file playback and release resources before
* leaving the page.
*/
public void stop()
{
    if (player != null)
    {
        player.stop();
        player.deallocate();
    }
}
/**
* This controllerUpdate function must be defined in order
* to implement a ControllerListener interface. This
* function will be called whenever there is a media event.
*/
public synchronized void controllerUpdate(ControllerEvent event)
{
```

```
        // If we're getting messages from a dead player,
        // just leave
        if (player == null) return;
        // When the player is Realized, get the visual
        // and control components and add them to the Applet
        if (event instanceof RealizeCompleteEvent)
        {
            if ((visualComponent = player.getVisualComponent()) != null)
                add("Center", visualComponent);
            if ((controlComponent = player.getControlPanelComponent()) != null)
                add("South",controlComponent);
                // force the applet to draw the components
                validate();
        }
        else if (event instanceof CachingControlEvent)
        {
            // Put a progress bar up when downloading starts,
            // take it down when downloading ends.
            CachingControlEvent    e = (CachingControlEvent) event;
            CachingControl         cc = e.getCachingControl();
            long cc_progress       = e.getContentProgress();
            long cc_length         = cc.getContentLength();
            // Add the bar if not already there . . .
            if (progressBar == null)
                if ((progressBar = cc.getProgressBarComponent()) != null)
                {
                    add("North", progressBar);
                    validate();
                }
            // Remove bar when finished ownloading
            if (progressBar != null)
                if (cc_progress == cc_length)
                {
                    remove (progressBar);
                    progressBar = null;
                    validate();
                }
        }
        else if (event instanceof EndOfMediaEvent)
        {
            // We've reached the end of the media; rewind and
            // start over
            player.setMediaTime(new Time(0));
            player.start();
        }
        else if (event instanceof ControllerErrorEvent)
        {
            // Tell TypicalPlayerApplet.start() to call it a day
            player = null;
            Fatal (((ControllerErrorEvent)event).getMessage());
        }
    }
    void Fatal (String s)
    {
        // Applications will make various choices about what
        // to do here. We print a message and then exit
        System.err.println("FATAL ERROR: " + s);
        throw new Error(s);      // Invoke the uncaught exception
                                 // handler System.exit() is another
                                 // choice
    }
}
```

Appendix B: Sample Data Source Implementation

This sample demonstrates how to implement a new DataSource to support an additional protocol, the FTP protocol. There are two classes:

DataSource extends PullDataSource and implements intel.media.protocol.PullProtocolHandler.

FTPSourceStream implements PullSourceStream.

FTP Data Source

```
package COM.intel.media.protocol.ftp;
import javax.media.protocol.PullDataSource;
import javax.media.protocol.SourceStream;
import javax.media.protocol.PullSourceStream;
import javax.media.Time;
import javax.media.Duration;
import java.io.*;
import java.net.*;
import java.util.Vector;
```

```java
public class DataSource extends PullDataSource
{
    public static final int FTP_PORT = 21;
    public static final int FTP_SUCCESS = 1;
    public static final int FTP_TRY_AGAIN = 2;
    public static final int FTP_ERROR = 3;
    // used to send commands to server
    protected Socket controlSocket;
    // used to receive file
    protected Socket dataSocket;
    // wraps controlSocket's output stream
    protected PrintStream controlOut;
    // wraps controlSocket's input stream
    protected InputStream controlIn;
    // hold (possibly multi-line) server response
    protected Vector response = new Vector(1);
    // reply code from previous command
    protected int previousReplyCode;
    // are we waiting for command reply?
    protected boolean replyPending;
    // user login name
    protected String user = "anonymous";
    // user login password
    protected String password = "anonymous";
    // FTP server name
    protected String hostString;
    // file to retrieve
    protected String fileString;
    public void connect() throws IOException
    {
        initCheck(); // make sure the locator is set
        if (controlSocket != null)
        {
            disconnect();
        }
        // extract FTP server name and target filename from locator
        parseLocator();
        controlSocket = new Socket(hostString, FTP_PORT);
        controlOut = new PrintStream(new BufferedOutputStream(
            controlSocket.getOutputStream()), true);
        controlIn = new
            BufferedInputStream(controlSocket.getInputStream());
        if (readReply() == FTP_ERROR)
        {
            throw new IOException("connection failed");
        }
        if (issueCommand("USER " + user) == FTP_ERROR)
        {
            controlSocket.close();
            throw new IOException("USER command failed");
        }
        if (issueCommand("PASS" + password) == FTP_ERROR)
        {
            controlSocket.close();
            throw new IOException("PASS command failed");
        }
    }
}
public void disconnect()
{
    if (controlSocket == null)
    {
        return;
    }
    try
    {
        issueCommand("QUIT");
        controlSocket.close();
    }
    catch (IOException e)
    {
        // do nothing, we just want to shutdown
    }
    controlSocket = null;
    controlIn = null;
    controlOut = null;
}
public void start() throws IOException
{
    ServerSocket serverSocket;
    InetAddress myAddress = InetAddress.getLocalHost();
    byte[] address = myAddress.getAddress();
    String portCommand = "PORT";
    serverSocket = new ServerSocket(0, 1);
    // append each byte of our address (comma-separated)
    for (int i = 0; i < address.length; i++)
    {
        portCommand = portCommand + (address[i] & 0xFF) + ",";
    }
    // append our server socket's port as two comma-separated
    // hex bytes
    portCommand = portCommand +
        ((serverSocket.getLocalPort() >>> 8)
        & 0xFF) + "," + (serverSocket.getLocalPort() & 0xFF);
    // issue PORT command
    if (issueCommand(portCommand) == FTP_ERROR)
    {
        serverSocket.close();
        throw new IOException("PORT");
    }
    // issue RETRieve command
    if (issueCommand("RETR" + fileString) == FTP_ERROR)
    {
        serverSocket.close();
        throw new IOException("RETR");
    }
    dataSocket = serverSocket.accept();
    serverSocket.close();
}
public void stop()
{
    try
    {
        // issue ABORt command
        issueCommand("ABOR");
        dataSocket.close();
    }
    catch(IOException e) {}
}
public String getContentType()
{
    // We don't get MIME info from FTP server. This
    // implementation makes an attempt guess the type using
    // the File name and returns "unknown" in the default case.
    // A more robust mechanisms should
    // be supported for real-world applications.
    String locatorString = getLocator().toExternalForm();
    int dotPos = locatorString.lastIndexOf(".");
    String extension = locatorString.substring(dotPos + 1);
    String typeString = "unknown";
    if (extension.equals("avi"))
        typeString = "video.x-msvideo";
    else if (extension.equals("mpg") ||
        extension.equals("mpeg"))
        typeString = "video.mpeg";
    else if (extension.equals("mov"))
        typeString = "video.quicktime";
    else if (extension.equals("wav"))
        typeString = "audio.x-wav";
    else if (extension.equals("au"))
        typeString = "audio.basic";
    return typeString;
}
public PullSourceStream[] getStreams()
{
    PullSourceStream[] streams = new PullSourceStream[1];
    try
    {
        streams[0] = new
            FTPSourceStream(dataSocket.getInputStream());
    }
    catch(IOException e)
    {
        System.out.println("error getting streams");
    }
    return streams;
}
public Time getDuration()
{
```

```
                return Duration.DURATION_UNKNOWN;
        }
        public void setUser(String user)
        {
                this.user = user;
        }
        public String getUser()
        {
                return user;
        }
        public void setPassword(String password)
        {
                this.password = password;
        }
        public String getPassword()
        {
                return password;
        }
        private int readReply() throws IOException
        {
                previousReplyCode = readResponse();
                System.out.println(previousReplyCode);
                switch (previousReplyCode / 100)
                {
                        case 1:
                                replyPending = true;
                                // fall through
                        case 2:
                        case 3:
                                return FTP_SUCCESS;
                        case 5:
                                if (previousReplyCode == 530)
                                {
                                        if (user == null)
                                        {
                                                throw new IOException("Not logged in");
                                        }
                                        return FTP_ERROR;
                                }
                                if (previousReplyCode == 550)
                                {
                                        throw new FileNotFoundException();
                                }
                }
                return FTP_ERROR;
        }
        /**
         * Pulls the response from the server and returns the code as a
         * number. Returns -1 on failure.
         */
        private int readResponse() throws IOException
        {
                StringBuffer buff = new StringBuffer(32);
                String responseStr;
                int     c;
                int     continuingCode = -1;
                int     code = 0;
                response.setSize(0);
                while (true)
                {
                        while ((c = controlIn.read()) != -1)
                        {
                                if (c == '\r')
                                {
                                        if ((c = controlIn.read()) != '\n')
                                        {
                                                buff.append('\r');
                                        }
                                }
                                buff.append((char)c);
                                if (c == '\n')
                                {
                                        break;
                                }
                        }
                        responseStr = buff.toString();
                        buff.setLength(0);
                        try
                        {
                                code = Integer.parseInt(responseStr.substring(0, 3));
                        }
                        catch (NumberFormatException e)
                        {
                                code = -1;
                        }
                        catch (StringIndexOutOfBoundsException e)
                        {
                                /* this line doesn't contain a response code, so
                                 * we just completely ignore it
                                 */
                                continue;
                        }
                        response.addElement(responseStr);
                        if (continuingCode != -1)
                        {
                                /* we've seen a XXX- sequence */
                                if (code != continuingCode ||
                                        (responseStr.length() >= 4 &&
                                        responseStr.charAt(3) == '-'))
                                {
                                        continue;
                                }
                                else
                                {
                                        /* seen the end of code sequence */
                                        continuingCode = -1;
                                        break;
                                }
                        }
                        else if (responseStr.length() >= 4 &&
                                responseStr.charAt(3) == '-')
                        {
                                continuingCode = code;
                                continue;
                        }
                        else
                        {
                                break;
                        }
                }
                previousReplyCode = code;
                return code;
        }
        private int issueCommand(String cmd) throws IOException
        {
                int reply;
                if (replyPending)
                {
                        if (readReply() == FTP_ERROR)
                        {
                                System.out.print("Error reading pending reply\n");
                        }
                }
                replyPending = false;
                do
                {
                        System.out.println(cmd);
                        controlOut.print(cmd + "\r\n");
                        reply = readReply();
                } while (reply == FTP_TRY_AGAIN);
                return reply;
        }
        /**
         * Parses the mediaLocator field into host and file strings
         */
        protected void parseLocator()
        {
                initCheck();
                String rest = getLocator().getRemainder();
                System.out.println("Begin parsing of: " + rest);
                int p1, p2 = 0;
                p1 = rest.indexOf("//");
                p2 = rest.indexOf("/", p1+2);
                hostString = rest.substring(p1 + 2, p2);
```

-continued

```
        fileString = rest.substring(p2);
        System.out.println("host: " + hostString +" file: " +
            fileString);
    }
}
```

Source Stream

```
package intel.media.protocol.ftp;
import java.io.*;
import javax.media.protocol.ContentDescriptor;
import javax.media.protocol.PullSourceStream;
import javax.media.protocol.SourceStream;
public class FTPSourceStream implements PullSourceStream
{
    protected InputStream dataIn;
    protected boolean eofMarker;
    protected ContentDescriptor cd
    public FTPSourceStream(InputStream in)
    {
        this.dataIn = in;
        eofMarker = false;
        cd = new ContentDescriptor("unknown");
    }
    // SourceSteam methods
    public ContentDescriptor getContentDescriptor()
    {
        return cd;
    }
    public void close() throws IOException
    {
        dataIn.close();
    }
    public boolean endOfStream()
    {
        return eofMarker;
    }
    // PullSourceStream methods
    public int available() throws IOException
    {
        return dataIn.available();
    }
    public int read(byte[] buffer, int offset, int length) throws
IOException
    {
        int n = dataIn.read(buffer, offset, length);
        if (n == -1)
        {
            eofMarker = true;
        }
        return n;
    }
    public boolean willReadBlock() throws IOException
    {
        if(eofMarker)
        {
            return true;
        }
        else
        {
            return dataIn.available() == 0;
        }
    }
    public long getContentLength()
    {
        return SourceStream.LENGTH_UNKNOWN;
    }
}
```

Appendix C: Sample Controller Implementation

This sample illustrates how a simple time-line Controller can be implemented in JMF. This example includes three classes:

TimeLineController.java
  The Controller. You give it an array of time values (representing a time line) and it keeps track of which segment in the time line you are in.
TimeLineEvent.java
  An event posted by the TimeLineController when the segment in the time line changes.
EventPostingBase.java
  A base class used by TimeLineController that handles the Controller methods addControllerListener and removeControllerListener. It also provides a postEvent method that can be used by the subclass to post events.

This implementation also uses two additional classes whose implementations are not shown here.
  EventPoster
    A class that spins a thread to post events to a ControllerListener
  BasicClock
    A simple Clock implementation that implements all of the Clock methods.
TimeLineEvent

```
TimeLineEvent.java
import javax.media.*;
// TimeLineEvent -- posted by TimeLineController when we have
// switched segments in the time line.
public class TimeLineEvent extends ControllerEvent
{
    protected int segment;
    public TimeLineEvent (Controller source, int currentSegment)
    {
        super (source);
        segment = currentSegment;
    }
    public final int getSegment ()
    {
        return segment;
    }
}
```

EventPostingBase

```
EventPostingBase.java
import javax.media.*;
import CDM.yourbiz.media.EventPoster;
// EventPoster supports two methods:
//       public EventPoster ();
//       public void postEvent (ControllerListener who,
//            ControllerEvent what);
// A list of controller listeners that we are supposed to send
// events to.
class ListenerList
{
    ControllerListener observer;
    ListenerList next;
}
public class EventPostingBase
{
    protected ListenerList olist;
    protected Object olistLock;
    protected EventPoster eventPoster;
    // We sync around a new object so that we don't mess with
    // the super class synchronization.
    EventPostingBase ()
    {
        olistLock = new Object ();
    }
    public void addControllerListener (ControllerListener observer)
    {
```

```
            synchronized (olistLock)
            {
                if (eventPoster == null)
                {
                    eventPoster = new EventPoster ();
                }
                ListenerList iter;
                for (iter = olist; iter != null; iter = iter.next)
                {
                    if (iter.observer == observer) return;
                }
                iter = new ListenerList ();
                iter.next = olist;
                iter.observer = observer;
                olist = iter;
            }
    }
    public void removeControllerListener (ControllerListener observer)
    {
            synchronized (olistLock)
            {
                if (olist == null)
                {
                    return;
                }
                else if (olist.observer == observer)
                {
                    olist = olist.next;
                }
                else
                {
                    ListenerList iter;
                    for (iter = olist; iter.next != null; iter = iter.next)
                    {
                        if (iter.next.observer == observer)
                        {
                            iter.next = iter.next.next;
                            return;
                        }
                    }
                }
            }
    }
    protected void postEvent (ControllerEvent event)
    {
            synchronized (olistLock)
            {
                ListenerList iter;
                for (iter = olist; iter != null; iter = iter.next)
                {
                    eventPoster.postEvent (iter.observer, event);
                }
            }
    }
}
```

TimeLineController

```
TimeLineController.java
import javax.media.*;
import COM.yourbiz.media.BasicClock;
// This Controller uses two custom classes:
//      The base class is EventPostingBase. It has three methods:
//          public void addControllerListener (ControllerListener
//              observer);
//          public void removeControllerListener (ControllerListener
//              observer);
//          protected void postEvent (ControllerEvent event);
//
//      This Controller posts TimeLineEvents. TimeLineEvent has
//      two methods:
//          public TimeLineEvent (Controller who, int
//              segmentEntered);
//          public final int getSegment ();
public class TimeLineController extends EventPostingBase
    implements Controller, Runnable
{
    Clock ourClock;
    // This simple controller really only has two states:
    // Prefetched and Started.
    int ourState;
    long timeLine[];
    int currentSegment = -1;
    long duration;
    Thread myThread;
    // Create a TimeLineController giving it a sorted time line.
    // The TimeLineController will post events indicating when
    // it has passed to different parts of the time line.
    public TimeLineController (long timeLine[])
    {
        this.timeLine = timeLine;
        ourClock = new BasicClock ();
        duration = timeLine[timeLine.length-1];
        myThread = null;
        // We always start off ready to go!
        ourState = Controller.Prefetched;
    }
    // Binary search for which segment we are now in. Segment
    // 0 is considered to start at 0 and end at timeLine[0].
    // Segment timeLine.length is considered to start at
    // timeLine[timeLine.length-1] and end at infinity. At the
    // points of 0 and timeLine[timeLine.length-1] the
    // Controller will stop (and post an EndOfMedia event).
    int computeSegment (long time)
    {
        int max = timeLine.length;
        int min = 0;
        for (;;)
        {
            if (min == max) return min;
            int current = min + ((max - mim) >> 1);
            if (time < timeLine[current])
            {
                max = current;
            }
            else
            {
                min = current + 1;
            }
        }
    }
    // These are all simple. . .
    public float setRate (float factor)
    {
        // We don't support a rate of 0.0. Not worth the extra math
        // to handle something the user should do with the stop()
        // method!
        if (factor == 0.0f)
        {
            factor = 1.0f;
        }
        float newRate = ourClock.setRate (factor);
        postEvent (new RateChangeEvent (this, newRate));
        return newRate;
    }
    public void setTimeBase (TimeBase master)
        throws IncompatibleTimeBaseException
    {
        ourClock.setTimeBase (master);
    }
    public long getStopTime ()
    {
        return ourClock.getStopTime ();
    }
    public long getSyncTime ()
    {
        return ourClock.getSyncTime ();
    }
    public long mapToTimeBase (long t) throws ClockStoppedException
    {
        return ourClock.mapToTimeBase (t);
    }
    public long getMediaTime ()
    {
```

```
        return ourClock.getMediaTime ();
    }
    public TimeBase getTimeBase ()
    {
        return ourClock.getTimeBase ();
    }
    public float getRate ()
    {
        return ourClock.getRate ();
    }
    // From Controller
    public int getState ()
    {
        return ourState;
    }
    public int getTargetState ()
    {
        return ourState;
    }
    public void realize ()
    {
        postEvent (new RealizeCompleteEvent (this, ourState,
            ourState, ourState));
    }
    public void prefetch ()
    {
        postEvent (new PrefetchCompleteEvent (this, ourState,
            ourState, ourState));
    }
    public void deallocate () {
        postEvent (new DeallocateEvent (this, ourState,
            ourState, ourState, ourClock.get.MediaTime ()));
    }
    public long getStartLatency ()
    {
        // We can start immediately, of course'
        return 0;
    }
    public Control[] getControls ()
    {
        return new Control[0];
    }
    public long getDuration ()
    {
        return duration;
    }
    // This one takes a little work as we need to compute if we
    // changed segments.
    public void setMediaTime (Time now)
    {
        ourClock.setMediaTime (now);
        postEvent (new MediaTimeSetEvent (this. now)):
        checkSegmentChange (now);
    }
    // We now need to spin a thread to compute/observe the
    // passage of time.
    public synchronized void syncStart (long tbTime)
    {
        long startTime = ourClock.getMediaTime ();
        // We may actually have to stop immediately with an
        // EndOfMediaEvent. We compute that now. If we are already
        // past end of media, then we
        // first post the StartEvent then we post a EndOfMediaEvent
        boolean endOfMedia;
        float rate = ourClock.getRate ();
        if ((startTime > duration && rate >= 0.0f) ||
            (startTime < 0 && rate <= 0.0f))
        {
            endOfMedia = true;
        } else
        {
            endOfMedia = false;
        }
        // We face the same possible problem with being past the stop
        // time. If so, we stop immediately.
        boolean pastStopTime;
        long stopTime = ourClock.getStopTime ();
        if ((stopTime != Long.MAX_VALUE) &&
            ((startTime >= stopTime && rate >= 0.0f) ||
            (startTime <= stopTime && rate <= 0.0f)))
        {
            pastStopTime = true;
        }
        else
        {
            pastStopTime = false;
        }
        if (!endOfMedia && !pastStopTime)
        {
            ourClock.syncStart (tbTime);
            ourState = Controller.Started;
        }
        postEvent (new StartEvent (this, Controller.Prefetched,
            Controller.Started, Controller.Started,
            startTime, tbTime));
        if (endOfMedia)
        {
            postEvent (new EndOfMediaEvent (this,
                Controller.Started,
                Controller.Prefetched, Controller.Prefetched,
                startTime));
        }
        else if (pastStopTime)
        {
            postEvent (new StopAtTimeEvent (this, Controller.Started,
                Controller.Prefetched, Controller.Prefetched,
                startTime));
        }
        else
        {
            myThread = new Thread (this, "TimeLineController");
            // Set thread to appopriate priority. . .
            myThread.start ();
        }
    }
    // Nothing really special here except that we need to notify
    // the thread that we may have.
    public synchronized void setStopTime (Time stopTime)
    {
        ourClock.setStopTime (stopTime):
        postEvent (new StopTimeChangeEvent (this, stopTime));
        notifyAll ();
    }
    // This one is also pretty easy. We stop and tell the running
    // thread to exit.
    public synchronized void stop ()
    {
        int previousState = ourState;
        ourClock.stop ();
        ourState = Controller.Prefetched;
        postEvent (new StopByRequestEvent (this, previousState,
            Controller.Prefetched, Controller.Prefetched,
            ourClock.getMediaTime ())):
        notifyAll ();
        // Wait for thread to shut down.
        while (myThread != null)
        {
            try
            {
                wait ();
            }
            catch (InterruptedException e)
            {
                // NOT REACHED
            }
        }
    }
    protected void checkSegmentChange (long timeNow)
    {
        int segment = computeSegment (timeNow);
        if (segment != currentSegment)
        {
            currentSegment = segment;
            postEvent (new TimeLineEvent (this, currentSegment));
        }
    }
    // Most of the real work goes here. We have to decide when
    // to post events like EndOfMediaEvent and StopAtTimeEvent
```

-continued

```
// and TimeLineEvent.
public synchronized void run ()
{
    for (;;)
    {
        // First, have we changed segments? If so, post an event!
        long timeNow = ourClock.getMediaTime ();
        checkSegmentChange (timeNow);
        // Second, have we already been stopped? If so, stop
        // the thread.
        if (ourState == Controller.Prefetched)
        {
            myThread = null;
            // If someone is waiting for the thread to die, let them
            // know.
            notifyAll ();
            break;
        }
        // Current rate. Our setRate() method prevents the value
        // 0 so we don't check for that here.
        float ourRate = ourClock.getRate ();
        // How long in clock time do we need to wait before doing
        // something?
        long mediaTimeToWait;
        long endOfMediaTime;
        // Next, are we past end of media?
        if (ourRate > 0.0f)
        {
            mediaTimeToWait = duration - timeNow;
            endOfMediaTime = duration;
        }
        else
        {
            mediaTimeToWait = timeNow;
            endOfMediaTime = 0;
        }
        // If we are at (or past) time to stop due to EndOfMedia,
        // we do that now!
        if (mediaTimeToWait <= 0)
        {
            ourClock.stop ():
            ourClock.setMediaTime (endOfMediaTime);
            ourState = Controller.Prefetched;
            postEvent (new EndOfMediaEvent (this, Controller.Started,
                    Controller.Prefetched, Controller.Prefetched,
                    endOfMediaTime));
            continue;
        }
    }
    // How long until we hit our stop time?
    long stopTime = ourClock.getStopTime ();
    if (stopTime != Long.MAX_VALUE)
    {
        long timeToStop;
        if (ourRate > 0.0f)
        {
            timeToStop = stopTime - timeNow;
        }
        else
        {
            timeToStop = timeNow - stopTime;
        }
        // If we are at (or past) time to stop due to the stop
        // time, we stop now!
        if (timeToStop <= 0)
        {
            ourClock.stop ();
            ourClock.setMediaTime (stopTime);
            ourState = Controller.Prefetched;
            postEvent (new StopAtTimeEvent (this,
                    Controller.Prefetched, Controller.Prefetched,
                    stopTime));
            continue;
        }
        else if (timeToStop < mediaTimeToWait)
        {
            mediaTimeToWait = timeToStop;
        }
    }
    // How long until we pass into the next time line segment?
    long timeToNextSegment;
    if (ourRate > 0.0f)
    {
        timeToNextSegment = timeLine[currentSegment] -
            timeNow;
    }
    else
    {
        if (currentSegment == 0)
        {
            timeToNextSegment = timeNow;
        }
        else
        {
            timeToNextSegment = timeNow - timeLine[current
                Segment-1];
        }
    }
    if (timeToNextSegment < mediaTimeToWait)
    {
        mediaTimeToWait = timeToNextSegment;
    }
    // Do the ugly math to compute what value to pass to
    // wait():
    long waitTime;
    if (ourRate > 0)
    {
        waitTime = (long) ((float) mediaTimeToWait / ourRate) /
            1000000;
    }
    else
    {
        waitTime = (long) ((float) mediaTimetoWait / -ourRate) /
            1000000;
    }
    // Add one because we just rounded down and we don't
    // really want to waste CPU being woken up early.
    waitTime++;
    if (waitTime > 0)
    {
        // Bug in some systems deals poorly with really large
        // numbers. We will cap our wait() to 1000 seconds
        // which point we will probably decide to wait again,
        if (waitTime > 1000000) waitTime = 1000000;
        try
        {
            wait (waitTime);
        }
        catch (InterruptedException e)
        {
            // NOT REACHED
        }
    }
}
```

Appendix D: ControllerAdapter

This appendix describes an implementation of ControllerListener, ControllerAdapter, that can be easily extended to respond to particular events.

Implementing ControllerAdapter

ControllerAdapter is an event adapter that recieves ControllerEvents and dispatches them co an appropriate stub-method. Classes use this adapter by extending it and replacing only the message handlers that they are interested in.

```
import javax.media.*;
public void cachingControl(CachingControlEvent e) {}
    public void controllerClosed(ControllerClosedEvent e) {}
    public void controllerError(ControllerErrorEvent e) {}
    public void connectionError(ConnectionErrorEvent e) {}
    public void internalError(InternalErrorEvent e) {}
```

-continued

```
    public void resourceUnavailable(ResourceUnavailableEvent
            e) {}
    public void durationUpdate(DurationUpdateEvent e) {}
    public void mediaTimeSet(MediaTimeSetEvent e) {}
    public void rateChange(RateChangeEvent e) {}
    public void stopTimeChange(StopTimeChangeEvent e) {}
    public void transition(TransitionEvent e) {}
    public void prefetchComplete(PrefetchCompleteEvent e) {}
    public void realizeComplete(RealizeCompleteEvent e) {}
    public void start(StartEvent e) {}
    public void stop(StopEvent e) {}
    public void dataStarved(DataStarvedEvent e) {}
    public void deallocate(DeallocateEvent e) {}
    public void endOfMedia(EndOfMediaEvent e) {}
    public void restarting(RestartingEvent e) {}
    public void stopAtTime(StopAtTimeEvent e) {}
    public void stopByRequest(StopByRequestEvent e) {}
    /**
     * Main dispatching function. Subclasses should not need to
     * override this method, but instead subclass only
     * the individual event methods listed above that they need
     */
    public void controllerUpdate(ControllerEvent e) {
    if (e instanceof CachingControlEvent) {
        cachingControl((CachingControlEvent)e);
    } else if ( e instanceof ControllerClosedEvent) {
        controllerClosed((ControllerClosedEvent)e);
        if (e instanceof ControllerErrorEvent) {
        controllerError((ControllerErrorEvent)e);
        if (e instanceof DataLostErrorEvent) {
            connectionError((ConnectionErrorEvent)e);
        } else if (e instanceof InternalErrorEvent) {
            internalError((InternalErrorEvent)e);
        } else if (e instanceof ResourceUnavailableEvent) {
            resourceUnavailable((ResourceUnavailableEvent)e);
        }
        }
    } else if (e instanceof DurationUpdateEvent) {
        durationUpdate((DurationUpdateEvent)e);
    } else if (e instanceof MediaTimeSetEvent) {
        mediaTimeSet((MediaTimeSetEvent)e);
    } else if (e instanceof RateChangeEvent) {
        rateChange((RateChangeEvent)e);
    } else if (e instanceof StopTimeChangeEvent) {
        stopTimeChange((StopTimeChangeEvent)e);
    } else if (e instanceof TransitionEvent) {
        transition((TransitionEvent)e);
        if (e instanceof PrefetchCompleteEvent) {
        prefetchComplete((PrefetchCompleteEvent)e);
        } else if (e instanceof RealizeCompleteEvent) {
        realizeComplete((RealizeCompleteEvent)e);
        } else if (e instanceof StartEvent) {
        start((StartEvent)e);
        } else if (e instanceof StopEvent) {
        Stop((StopEvent)e);
        if(e instanceof DataStarvedEvent) {
            dataStarved((DataStarvedEvent)e);
        } else if (e instanceof DeallocateEvent) {
            deallocate((DeallocateEvent)e);
        } else if (e instanceof EndOfMediaEvent) {
            endOfMedia((EndOfMediaEvent)e);
        } else if (e instanceof RestartingEvent) {
            restarting((RestartingEvent)e);
        } else if (e instanceof StopAtTimeEvent) {
            stopAtTime((StopAtTimeEvent)e);
        } else if (e instanceof StopByRequestEvent) {
            stopByRequest((StopByRequestEvent)e);
        }
        }
    }
    }
}
```

Using ControllerAdapter

To implement the ControllerListener interface using a ControllerAdapter, you need to:

1. Subclass ControllerAdapter and override the event methods for the events that you're interested in.

2. Register your ControllerAdapter class as a listener for a particular Controller by calling addControllerListener.

When a Controller posts an event, it calls controllerUpdate on each registered listener. ControllerAdapter automatically dispatches the event to the appropriate event method, filtering out the events that you're not interested in.

For example, the following code extends a ControllerAdapter with a JDK 1.1 anonymous inner-class to create a self-contained Player that is automatically reset to the beginning of the media and deallocated when the Player reaches the end of the media:

```
player.addControllerListener(new ControllerAdapter() {
    public void endOfMedia(EndOfMediaEvent e) {
        Controller controller = e.getSource();
        controller.stop();
        controller.setMediaTime(0);
        controller.deallocate();
    }
}
```

If you register a single ControllerAdapter as a listener for multiple Players, in your event method implementations you need to determine which Player generated the event. Controller events come "stamped" with a reference to their source that you can access by calling getSource.

What is claimed is:

1. A method for playing media data contained in an unknown type datastream comprising:

receiving a datastream having a plurality of packets of data of an unknown type;

parsing said datastream to determine said type of said plurality of packets of data in said datastream;

selecting a depacketizer from among a plurality of depacketizers based on said determined type of said plurality of packets of data in said datastream, each of said plurality of depacketizers having a handler connected to it, said handler configured to manage frames of data;

providing said packets of data to said selected depacketizer, wherein said selected depacketizer assembles said packets of data into frames of data; and providing said frames of data to a handler connected to said selected depacketizer, wherein said handler connected to said selected depacketizer decodes said frames of data into media data, and said handler connected to said selected depacketizer playing said media data.

2. The method of claim 1, wherein said plurality of depacketizers is contained in a first depacketizer class.

3. The method of claim 2, further comprising:

adding a second depacketizer class containing a second plurality of depacketizers, wherein said selecting a depacketizer comprises searching for an appropriate depacketizer for said type of data in said first depacketizer class and if not found continuing said searching in said second depacketizer class.

4. The method of claim 1, wherein said receiving a datastream is by a realtime transport protocol session manager.

5. The method of claim 2, wherein said first depacketizer class is pluggable by an external user.

6. A system comprising:
 a processor;
 a memory;
 code stored in said memory and executed by said processor configured to play media data contained in an unknown type datastream; said code comprising:
  a method receiving a datastream having a plurality of packets of data of an unknown type;
  a method parsing said datastream to determine said type of said plurality of packets of data in said datastream;
  a method selecting a depacketizer from among a plurality of depacketizers based on said determined type of said plurality of packets of data in said datastream, each of said plurality of depacketizers having a handler connected to it, said handler configured to manager frames of data;
  a method providing said packets of data to said selected depacketizer, wherein said selected depacketizer assembles said packets of data into frames of data;
  a method providing said frames of data to a handler connected to said selected depacketizer, wherein said handler connected to said selected depacketizer decodes said frames of data into media data, and said handler connected to said selected depacketizer playing said media data.

7. The system of claim 6, wherein said plurality of depacketizers is contained in a first depacketizer class.

8. The system of claim 7, wherein said code further comprises:
 a method adding a second depacketizer class containing a second plurality of depacketizers, wherein said selecting a depacketizer comprises searching for an appropriate depacketizer for said type of data in said first depacketizer class and if not found continuing said searching in said second depacketizer class.

9. The system of claim 6, wherein said receiving a datastream is by a real time transport protocol session manager.

10. The method of claim 7, wherein said first depacketizer class is pluggable by an external user.

11. A computer program product comprising:
 a computer usable medium having computer readable program code embodied therein configured to play media data contained in an unknown type datastream; said computer program product comprising computer readable code configured to:
 receive a datastream having a plurality of packets of data of an unknown type;
 parse said datastream to determine said type of said plurality of packets of data in said datastream;
 select a depacketizer from among a plurality of depacketizers based on said determined type of said plurality of packets of data in said datastream, each of said plurality of depacketizers having a handler connected to it, said handler configured to manage frames of data;
 provide said packets of data to said selected depacketizer, wherein said selected depacketizer assembles said packets of data into frunes of data;
 provide said frames of data to a handler connected to said selected depacketizer, wherein said handler connected to said selected depacketizer decodes said frames of data into media data, and said handler connected to said selected depacketizer playing said media data.

12. The computer program product of claim 11, wherein said plurality of depacketizers is contained in a first depacketizer class.

13. The computer program product of claim 11, further comprising computer readable code configured to:
 add a second depacketizer class containing a second plurality of depacketizers, wherein said selecting a depacketizer comprises searching for an appropriate depacketizer for said type of data in said first depacketizer class and if not found continuing said searching in said second depacketizer class.

14. The computer program product of claim 11, wherein said receiving a datastream is by a real time transport protocol session manager.

15. The computer program product of claim 12, wherein said first depacketizer class is pluggable by an external user.

* * * * *